(12) United States Patent
      Armstrong

(10) Patent No.: US 12,670,482 B2
(45) Date of Patent: Jun. 30, 2026

(54) SYSTEM AND METHOD FOR PROCESSING TRANSACTIONS

(71) Applicant: Blockskye Inc., Lincoln, MA (US)

(72) Inventor: Brook Armstrong, Worthington, MA (US)

(73) Assignee: BLOCKSKYE, INC, Dover, DE (US)

( * ) Notice: Subject to any disclaimer, the term of this patent is extended or adjusted under 35 U.S.C. 154(b) by 495 days.

(21) Appl. No.: 17/583,082

(22) Filed: Jan. 24, 2022

(65) Prior Publication Data

US 2022/0237572 A1     Jul. 28, 2022

Related U.S. Application Data

(60) Provisional application No. 63/140,767, filed on Jan. 22, 2021.

(51) Int. Cl.
| | |
|---|---|
| *G06Q 30/00* | (2023.01) |
| *G06Q 20/02* | (2012.01) |
| *G06Q 20/24* | (2012.01) |
| *G06Q 20/26* | (2012.01) |
| *G06Q 20/40* | (2012.01) |

(52) U.S. Cl.
CPC .......... *G06Q 20/023* (2013.01); *G06Q 20/24* (2013.01); *G06Q 20/26* (2013.01); *G06Q 20/401* (2013.01); *G06Q 2220/00* (2013.01)

(58) Field of Classification Search
CPC ..................................................... G06Q 20/02
USPC .......... 705/44, 1.1, 39, 40, 36 R, 30, 80, 37; 713/168, 153, 193
See application file for complete search history.

(56) References Cited

U.S. PATENT DOCUMENTS

| | | | | |
|---|---|---|---|---|
| 2004/0002876 A1* | 1/2004 | Sommers | ............... | G06Q 30/06 705/6 |
| 2005/0289025 A1* | 12/2005 | Fredericks | ............. | G06Q 10/10 705/30 |
| 2021/0027293 A1* | 1/2021 | Groarke | ............... | G06Q 20/401 |
| 2021/0326844 A1* | 10/2021 | Zhou | ..................... | G06Q 20/06 |

OTHER PUBLICATIONS

ProQuestDialogNPL Search History.*
IP.COM NPL Search History.*

* cited by examiner

*Primary Examiner* — John H. Holly

(57) ABSTRACT

A system (200) and method (900) for facilitating transactions (70) that involve more than two parties (100). A ledger (500) is used to transcend the information silos resulting from parties (100) and IT platforms (210) that would otherwise impede the efficiency and accuracy of the system (200).

20 Claims, 19 Drawing Sheets

SYSTEM AND METHOD FOR PROCESSING TRANSACTIONS

RELATED APPLICATIONS

This utility patent application claims priority to the provisional patent application titled "SYSTEM AND METHOD FOR PROCESSING TRANSACTIONS AMONG DISPARATE COMPUTER SYSTEMS" (Ser. No. 63/140,767) that was filed on Jan. 22, 2021, the contents of which are hereby incorporated by reference in their entirety.

BACKGROUND OF THE INVENTION

The invention relates generally to systems and methods for processing transactions. More specifically, the system can process transactions where more than two parties are involved in the transaction, such as where the party making the decision to buy something will subsequently be fully reimbursed for the purchase (collectively, the "system"). The system was originally conceptualized to address flaws and limitations relating to the business travel marketplace, but the system can be implemented far beyond that context.

In 2019, global business travel spending reached $1.4 trillion dollars before falling 54% to $661 billion dollars due to the pandemic in 2020. According to the Global Business Travel Association's forecast that was reported on by CNBC on November 2021 report on CNBC, business travel in 2022 is expected to surpass the $1 trillion dollar threshold.

While the business travel marketplace is economically significant to buyers and sellers alike, that marketplace is plagued by intrenched structural inefficiencies resulting the use of intermediaries in lieu of direct interactions. Business travel involves more than two parties, and the inability of all the relevant parties to access pertinent and accurate information in a timely and convenient manner is a substantial obstacle of efficient processes. There are well established structural barriers stopping the prior art from addressing this problem.

I. Use of Intermediaries. In other contexts, a buyer pays money to a seller in exchange for goods or services that benefit the buyer. Both parties have access to all the relevant information. Adding third parties to the transaction changes that dynamic. Business travel involves more than two parties contracting with each other, and each party lacks access to pertinent information. The seller sells airline tickets, hotel stays, rental car service, etc. that a business or other organization ultimately pays for. However, in the instance of business travel, the seller deals almost exclusively with the traveler even though the traveler is not the ultimate payor of the expenses. The traveler has no direct access to the organization paying the bill, and the organization paying the bill has no direct access to the vendor providing the ticket or hotel room. There is also a time delay, as the business traveler is the initial payor for travel expenses, but the business traveler then submits expense reports to the employer for reimbursement. There are multiple payments for the same transaction, with the traveler paying the vendor and then the employer paying the traveler. The business traveler is a middleman navigating disparate processing with the seller and the employer. The number of intermediaries increases even further if travel agencies or travel portals are used or if the traveler's employer is providing consulting services to a client who is ultimately paying for the travel.

II. Over Reliance on Credit Cards. The redundant processes, information silos, and needless delays of time has resulted in an industry that is overly reliant on the use of credit cards. Credit card authorizations cost the vendors more than other forms of payment, but credit card authorizations give the traveler time to fill out expense reports and hopefully receive reimbursement before the applicable payment is due. Unfortunately, the service fees on credit cards do add up and they constitute an unnecessary expense by vendors that are ultimately passed along to the ultimate payors of business travel.

III. Inability to Access Information. Prior art computerized booking and expense reimbursement methodologies involve highly complex transactions between an increasing number of computer systems and platforms that are unable to share accurate information in appropriate ways in a timely manner across data silos. The inability to share data prevents their effective use. The prior art prevents parties from efficiently and accurately processing and manage service transactions related to service booking and expense reimbursement The system is described in greater detail below in the Summary of the Invention section.

SUMMARY OF THE INVENTION

The invention relates generally to systems and methods for processing transactions. More specifically, the system can process transactions where more than two parties are involved in the transaction, such as where the party making the decision to buy something will subsequently be fully reimbursed for the purchase (collectively, the "system").

The system was originally conceptualized to address flaws and limitations relating to the business travel marketplace, but the concepts can be applied far beyond that context.

The system can use a system-wide ledger to enable the exchange of information across the various data silos. Every party participating in the system can have selective access to the ledger to access information relevant to their participation in a transaction. The ability to better enable access to information allows parties utilizing the system to streamline processes and remove intermediaries. Instead of forcing individual business travelers to separately navigate processes with their employer and travel vendors, the system enables information such as an expense authorization from an employer or other organization with respect to be communicated by the system to the appropriate vendors, bypassing the need for reimbursements after the fact and enabling more accurate, timely, and automated management of those expenses.

The system can be better understood by referencing the drawings discussed below.

BRIEF DESCRIPTION OF THE DRAWINGS

Different examples of various attributes, components, and configurations that can be incorporated into the system are illustrated in the drawings described briefly below. No patent application can expressly disclose in words or in drawings, all of the potential embodiments of an invention. In accordance with the provisions of the patent statutes, the principles, functions, and modes of operation of the system are illustrated in certain preferred embodiments. However, it must be understood that the system may be practiced otherwise than is specifically illustrated without departing from its spirit or scope.

FIG. 3B is a diagram illustrating an example of different parties interacting through the system.

Figure 1A:
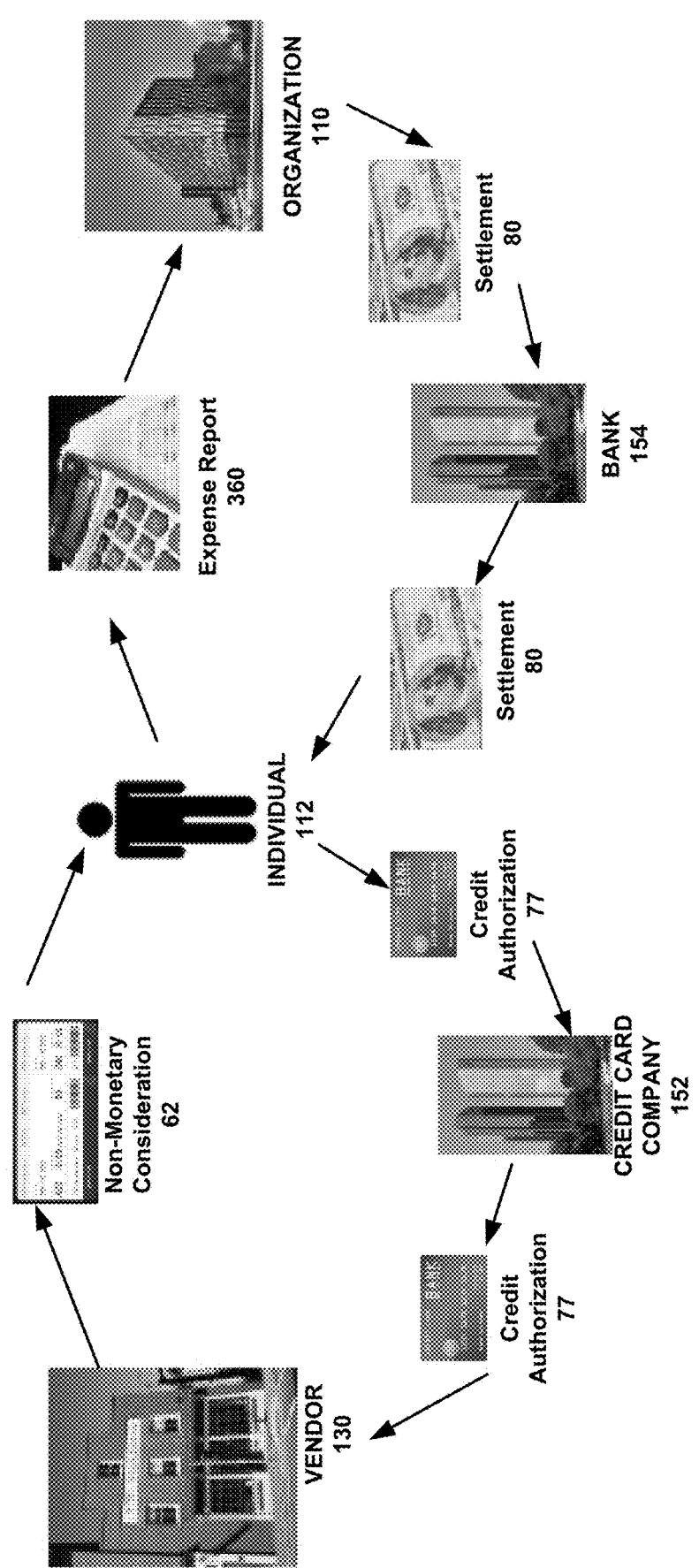
FIG. 1A is a block diagram illustrating an example of a prior art process by which business travel services are purchased, with the individual purchasing and utilizing the travel doing so on behalf of an organization, and with the organization subsequently reimbursing the individual after the submission of an expense report.

The system can be further understood by the text description provided below in the Detailed Description section.

DETAILED DESCRIPTION

The invention relates generally to systems and methods for processing transactions. More specifically, the system can process transactions where more than two parties are involved in the transaction, such as where the party making the decision to buy something will subsequently be fully reimbursed for the purchase (collectively, the "system"). The system was originally conceptualized to address flaws and limitations relating to the business travel marketplace, but the system can be implemented far beyond that context.

I. Alternative Embodiments

No patent application can expressly or comprehensively disclose in words or in drawings all of the potential embodiments of an invention. This is particularly true when the system can be used in conjunction with a wide variety of different configurations of information technology components and platforms and in a wide variety of operating contexts. In accordance with the provisions of the patent statutes, the principles, functions, and modes of operation of the system are illustrated in certain preferred embodiments. However, it must be understood that the system may be practiced otherwise than is specifically illustrated without departing from its spirit or scope. Alternative embodiments of the system can be described and categorized on the basis of a variety of variables.

Although the system was conceptualized with the goal of processing transactions involving business travel expenses, the system can be implemented more broadly than that. For example, there are other contexts in which employees or contractors routinely purchase items or services that are subsequently reimbursed by an employer or client. Whether the transactions involve buying packages on Amazon, food or beverages at Starbucks, or gas at a nearby gas station, the system could be used to cut out the middleman in those transactions as well. Moreover, the system could also be used in other third-party payor contexts that go beyond the employee/employer or contractor/company relationship, such as insurance, healthcare, secured lending, etc.

II. Glossary of Terms

All terminology associated with an element number is defined in Table 1 below.

TABLE 1

| Number | Name | Definition/Description |
|---|---|---|
| 60 | TRANSACTION | An exchange between two or more parties 100, in which promises of consideration 61 is exchanged. The system 200 was originally conceived to achieve efficiencies by streamlining transactions 60 where an individual 112, such as employee, associated with an organization 110, such as an employer obtains non-monetary consideration 62 from a vendor 130, such as an airline ticket, in exchange for monetary consideration 70 provided by the organization 110. |

TABLE 1-continued

| Number | Name | Definition/Description |
|---|---|---|
| 61 | Consideration | A promise by a party 100 to provide something of value in a transaction 60. Transactions 60 can involve non-monetary consideration 62 as well as monetary consideration 70. |
| 62 | Non-Monetary Consideration | A promise in transaction 60 that is not for the providing of money. In a sales transaction, the non-monetary consideration 62 is the good being sold. In a transaction for services, the non-monetary consideration 62 is the service being performed. The system 200 was originally conceived to achieve efficiencies by streamlining transactions 60 where an individual 112, such as employee, associated with an organization 110, such as an employer obtains non-monetary consideration 62 from a vendor 130, such as an airline ticket, in exchange for monetary consideration 70 provided by the organization 110. |
| 63 | Business-Travel Services | Services pertaining to travel on behalf of an organization 110, such as tickets 64, hotel rooms, rental cars, restaurant dinners, taxi cabs, and other similar benefits and services. |
| 64 | Ticket | Non-monetary consideration 62 in the form of a right to a seat on a plane, boat, bus, etc. It is believed that the system 200 will be particularly beneficial with respect to airline tickets 64. |
| 65 | Hotel Room | Non-monetary consideration 62 in the form a right to a night at a hotel. |
| 66 | Unused Consideration | Non-monetary consideration 62 that has not yet been utilized. By way of example unused airline tickets. |
| 68 | Use | An attribute that pertains to non-monetary consideration 62. In many embodiments of the system 200, non-monetary consideration 62 such as ticket 64 can be used, unused, or in a state of currently being used. |
| 70 | Monetary Consideration | Monetary consideration 70 is the payment of money. In many instances, monetary consideration 70 is provided in two steps: (1) a promise to pay 72; and (2) the settlement 80 of that promise. |
| 72 | Promise to Pay/Promise of Payment | In the formation of an agreement between the applicable parties 100, the buyer will often commit to a binding promise of payment 72. This can be done through a variety of different payment mechanisms, such as credit cards, debit cards, checks, certified checks, money orders, promissory notes, etc. |
| 77 | Credit Authorization | A promise of payment 72 that is made using a credit card. |
| 78 | Debit authorization | A promise of payment 72 that is made using a debit card. |
| 80 | Settlement/ Settlement Transfer | The fulfillment of a promise to pay 72, such as the closing on a house. Settlements 80 can involve a wide variety of means for transferring money from one party 100 to another party 100. Such mechanisms will often involve financial service entities 150 such as banks or credit unions. |
| 81 | Simultaneous Settlement or Real-Time Settlement | A settlement 80 that occurs in real time such that the promise to pay 75 and settlement 80 occur simultaneously or substantially simultaneously. |
| 82 | ACH | ACH stands for "Automated Clearing House. It's the financial network that electronically moves money and information from one bank to another. ACH payments are a way to electronically transfer money from one financial institution to another without the need for |

TABLE 1-continued

| Number | Name | Definition/Description |
|---|---|---|
| | | wire transfers, paper checks, cash, or credit/debit cards. The system 200 can be implemented to take full advantage of the existing ACH network. |
| 83 | eCheck | eCheck is a digital version of a paper check and is also known as an electronic check, online check, internet check, and direct debit. eChecks use the Automated Clearing House (ACH) 82 to direct debit from a customer's checking account into a merchant's business bank account, with the help of a payments processor. |
| 84 | Wire Transfer | The term wire transfer refers to an electronic transfer of funds via a network that is administered by banks and transfer service agencies around the world. Wire transfers involve a sending and receiving institution and require information from the party initiating the transfer, such as the receiver's name and account number. These transfers don't actually involve the physical exchange of cash but are settled electronically. Types of wire transfers include those facilitated between domestic banks and international ones. |
| 85 | Cash | Cash currency |
| 86 | Cryptocurrency or Cyber Currency | A digital or virtual currency that is secured by cryptography. Often utilize blockchain technology to promote use and security. |
| 88 | Credit | Unmonetized value that remains from the failure to use 68 unused non-monetary consideration 66. In many contexts, if a transaction 60 for the purchase of a good or service is subsequently cancelled, the monetary consideration 70 is fully refunded. That is not the case however with respect to all transactions 60 particularly transactions 60 involving business travel expenses 63. The ability of the system 200 to monitor the use 68 of such consideration 61 and to manage the credits 88 that result from non-use or cancellation can be an important advantage of the system 200 with respect to the prior art. |
| 90 | AUTHORIZA-TION | A grant of permission or authority by a party 100 that impacts the processing of the system 200. The system 200 was originally conceptualized to streamline the process of an individual 112 purchasing non-monetary consideration 62 such as business-travel services 63 from a vendor 130 based on an authorization 90 by the organization 110 associated with the individual 112. Examples of authorizations 90 include expense authorizations 96, transaction authorizations 94 and policies 92. |
| 92 | Policy | A rule of a party 100 with respect to one or more of applicable activities that are accessible through the system 200. By way of example, an organization 100 can have many policies 92 on business-travel expenses 73 that impact what transactions 70 are acceptable and which transactions 70 are not. In some embodiments of the system 200, policies 92 in conjunction with other variables and data points such as user profiles, expense codes 97, attributes of what is purchased (length of travel) can proactively impact not only what the individual does in terms of entering into transactions but even what options the individual can see on the system 200. |

TABLE 1-continued

| Number | Name | Definition/Description |
|--------|------|------------------------|
| 94 | Transaction Authorization | Permission pertaining to a type of transaction 70 or a party 100 participating in the transaction 70. |
| 96 | Expense Authorization | Permission pertaining to a monetary expenditure. In some embodiments of the system 200, an expense authorization 96 can be associated with one or more expense codes 97. |
| 97 | Expense Code | A key or indicator that links an expense authorization 96 to a particular activity, project, division, decision maker, etc. Different parties 100 using the system 200 to enable individuals 112 to enter into transactions 60 on behalf of the organization 110 can map their own profit and loss units into expense codes 97 that are cognizable to the system 200. |
| 100 | PARTIES/ ENTITIES | An individual, group of individuals, and organizations including but not limited to businesses, membership-based groups government agencies, and religious organizations capable of entering into transactions 60. Parties 100 can interact with the system 200 through their users 101 and administrators 102 as well as through IT infrastructures 210 that they control that interface with the system 200. |
| 101 | User | A human being interacting with the system 100 on behalf of a party 100. |
| 102 | Administrator | A human being authorized to manage the users 102 interacting with the system 100. Administrators 102 can be persons acting on behalf of the host 160, as well was persons acting on behalf of the parties 100 interacting with each other by participating in the transactions 60 and settlements 80 of the system 200. |
| 103 | Bot | An automated technology interacting with the system 100 on behalf of a party 100. The IT platforms 210 of the various parties 100 that exist independently of the operations of the system 200 can be enabled to interact with the system 200. |
| 104 | Role | A function played by a user 101 or party 100 participating in the interactions of the system 200. By way of example, an individual 112 can be an employee to an organization 110 and that organization 110 can provide consulting services through the individual 112 to a different organization 110. |
| 106 | Association | A relationship between two parties 100, two users 101, a party 100 and a user 101. |
| 108 | Sub-Unit | In many instances, a party 110 can be broken down or divided into subsidiaries, divisions, departments, etc. for accounting and other purposes. The expense codes 97 used by the system 200 to authorize expenditures can be defined in a highly granular manner as to match the internal accounting divisions within a party 100. Any sub-unit 108 of a party 100 that has its own distinct P&L (profit and loss) statement can have their own distinct expense code 97 that is associated with a distinct expense authorization 96. |
| 109 | Project or Program | In some embodiments, a party 100 will have specific projects or programs that are distinct from other operations. Such activities can also be mapped to distinct expense codes 97 and expense authorizations 96. |
| 110 | Organization | A party 110 that uses the system 200 to create authorizations 90, such as expense authorizations 96, in support of transactions 60 of the individuals 112 who are acting on behalf of the organization |

TABLE 1-continued

| Number | Name | Definition/Description |
|--------|------|------------------------|
| | | 110. Organizations 110 can include but are not limited to corporations, partnerships, LLCs, membership-based organizations, non-profit organizations, religious institutions, and government agencies. |
| 112 | Individual | A human being who is engaging with a vendor 130 to form a transaction 60 that is to be funded by an organization 110 with whom the individual 112 plays some role 104 or has some relationship 106. and has some measure of discretion to engage in transactions 70 in which the individual 112 receives non-monetary consideration 62 that the organization 110 is paying for. In many embodiments of the system 200 that relate to transactions 60 for business travel services 63, the individual 112 is an employee, contractor, or consultant who is travelling on behalf of the organization 110 paying the for the travel. The individual 112 is the person utilizing the non-monetary consideration 62, so in the context of business travel services 63, the individual 112 is the person traveling. In many instances, the individual is also the user 101 booking their airlines, hotels, etc. |
| 120 | Employer | An organization 110 to whom the individual 112 is an employee. |
| 122 | Client/Customer | An organization 110 can be a client or a customer of another organization. |
| 130 | Vendor | A provider of non-monetary consideration 62 through transactions 60 entered into through use of the system 200. |
| 132 | Airline | A vendor 130 in the business of air travel. |
| 134 | Hotel | A vendor 130 in the business of selling stays at a hotel. |
| 136 | Rental Car | A vendor 130 in the business of renting cars to travelers. |
| 138 | Travel Agency | A vendor 130 in the business of making travel arrangements on behalf of travelers. |
| 140 | Food | A vendor 130 in the business of selling meals to travelers. |
| 142 | Travel Portal | An IT Infrastructure 210 where travel transactions can be purchased. |
| 150 | Financial Services Organization | A financial services company that provides the mechanism for actually transferring the funds to accomplish a settlement 80 of the transaction 60, such as a bank 154, credit union 156, or credit card company 152 |
| 152 | Credit Card | A company that issues credit cards. |
| 154 | Bank | A company that accepts and safeguards money for account holders. |
| 156 | Credit Union | A nonprofit cooperative of members that functions like a bank. |
| 158 | Account | An arrangement by which a financial services organization 150 accepts a customer's/account holder's financial assets and holds them on behalf of the customer/account holder. |
| 160 | Host | An entity responsible for the operation and maintenance of the system 200. In some instances, the host 160 is neutral with respect to the other parties 100, and the host does not participate in the transactions of the system 200. In other embodiments, the host 160 of the system 200 can actively participate as a vendor 130, a financial services organization 150, or some other organization 110 that enters into transactions 60 utilizing the system 200. |
| 170 | GDS or Global Distribution Systems | Global distribution systems are corporate operated systems that keep track of travel inventories (e.g., air, hotel, car rental) for their corporate travelers, as well as keep |

TABLE 1-continued

| Number | Name | Definition/Description |
| --- | --- | --- |
| | | track of corporate travel parameters (e.g., travel policies, corporate negotiated rates, etc.). But such systems are severely limited in that they are designed for booking via travel agencies. Moreover, there are unnecessary fees from both the global distribution system and the travel agencies. |
| 180 | Online Booking Tool or OBT | Similar to a travel agency, except the service is provide through an IT platform 210. |
| 200 | SYSTEM | An IT platform 210 that is implemented to maintain the ledger 500 and to enable other IT platforms 210 from the participating parties 100 to interact with each other through the system 100 and the ledger 500. |
| 210 | IT Platform or IT Infrastructure | A configuration of computers 220, applications 230, user interfaces 240, databases 250 and networks 260 that: (1) are under the control of the host 160 and enable the functionality of the system 200; or (2) are under the control of another party 100 participating in the system 200 to conduct applicable business activities as well as interact with the system 200. |
| 220 | Computer | A digital electronic device that can run applications 230 and process data. Computers 220 typically include a processor/RAM 222 component as well as some type of storage component 224 for storing data. Examples of computers include but are not limited mainframe computers, workstations, desktop computers servers, laptops, smart phones and smart watches. |
| 222 | Processor | Sometimes referred to as the CPU or central processing unit, the processor 222 is an integrated electronic circuit that performs the calculations that run a computer 220. |
| 224 | Storage Component | A device such as hard drives, solid state drives, optical drives, flash memory, random access memory, or any other presently existing or subsequently invented way to store data. |
| 230 | Application/ Program | A set of instructions which are "run" by the processor 222 of a computer. Applications 230 can exist in source code as well as object code form. |
| 240 | Interface | A device or program that enables interactions between programs 230, IT platforms 210, or in the case of a user interface 242, a user 101 and a computer 220. |
| 242 | User Interface | A programming layer, typically a graphical media, through which a user 101 interacts with a computer 220. |
| 250 | Database | An application 230 that serves the function of organizing data so that it can be efficiently stored, searched, updated, and deleted. The various IT platforms 210 of the participating parties 100 will involve databases 250 that can manage information relevant to the processing of transactions 60 by the system 200. |
| 260 | Network | A connection between two or more computers 220 or similar devices. Networks 260 can be private, public, or something in between. The Internet is a prominent example of a network 260. The system 200 can interact with the IT. platforms of the participating parties 100 through the use of networks 260. |

TABLE 1-continued

| Number | Name | Definition/Description |
| --- | --- | --- |
| 270 | Notification | A message generated by the system 200. |
| 280 | Prohibition | An action prevented by the system 200. |
| 300 | Transaction Subsystem/ Layer | The IT Platform 210 of the system 200 performing processing that relates to the formation and execution of transactions 60 as well as the recording of transaction records 530 on the ledger 500. The transaction subsystem 300 can interact with various IT platforms 210 of the participating parties 100. |
| 350 | Settlement Subsystem/ Layer | The IT Platform 210 of the system 200 performing processing that relates to the settlement 80 and recording of settlement records 540 on the ledger 500. |
| 360 | Expense Report | A submission by an individual 112 to an organization 110 in order to receive a reimbursement of travel expenses. The system 200 can make expense reports 360 obsolete. |
| 370 | Expense Invoice | An invoice by an organization 110 to its client 122 for reimbursement of travel expenses. The system can make expense invoices 270 obsolete. |
| 400 | Use Subsystem/ Layer | The IT Platform 210 of the system 200 performing processing that relates to the use 68 and recording of used records 550 on the ledger 500. |
| 450 | Credit Subsystem/ Layer | The IT Platform 210 of the system 200 performing processing that relates to credits 88 and recording credit records 560 on the ledger 500. |
| 500 | Ledger | An information processing platform 210 used by the system 200 to enable the features and advantages of the system 200. The various parties 100 can interact the system 200 and the ledger 500 through their own respective IP platforms 210. The ledger 500 selectively makes the appropriate information to the appropriate parties 100 participating in a transaction 70 supported by the system 200. The ledger 500 can be implemented using a wide variety of technologies that are capable of storing, updating, and retrieving information. Common examples of the ledger 500 used by the system 100 can include but are not limited to: (1) a blockchain ledger 502; and (2) a database 504 that the participating parties 100 have selective access to. In many embodiments, the ledger 500 will be designed, configured, controlled, and maintained by a neutral host 160 who is not otherwise a participating party 100 in the system 200. In other embodiments, the host 160 of the system 200 will also be party 100 engaging in transactions 70, settlements 80, and other processes as a participant. |
| 502 | Blockchain Ledger | One category of ledger 500 embodiments is blockchain ledgers 50. A blockchain is a distributed peer-to-peer database that is shared among the nodes of a computer network. As a database, a blockchain stores information electronically in digital format that is encrypted. One key difference between a typical database and a blockchain is how the data is structured. A blockchain collects information together in groups, known as blocks, that hold sets of information. Blocks have certain storage capacities and, when filled, are closed and linked to the previously filled block, forming a chain of data known as the blockchain. All new information that follows that freshly added block is compiled into a newly formed block that will then also be added to the |

TABLE 1-continued

| Number | Name | Definition/Description |
|--------|------|------------------------|
| | | chain once filled. A database usually structures its data into tables, whereas a blockchain, like its name implies, structures its data into chunks or blocks that are strung together in a chain. This data structure inherently makes an irreversible timeline of data when implemented in a decentralized nature. When a block is filled, it is set in stone and becomes a part of this timeline. Each block in the chain is given an exact time stamp when it is added to the chain. |
| 504 | Database Ledger | Another category of ledger embodiments is a conventional database 504. The database ledger 504 functions as a "register of deeds" for the system 200, enabling records to be added, but not modified or deleted. To "undo" a record, one has to record a superseding record to "zero out" the earlier record. |
| 520 | Ledger Record | An entry on the ledger 520. Different actions by the various parties 100 using the system 200 can trigger the creation and recording of a ledger record 520 on the ledger 510. Each ledger record 520 can be associated with a record ID 522 that is unique to the system 200. In some embodiments, each ledger record 520 also includes an applicable expense authorization 96 or an expense code 97. |
| 522 | Record ID | A unique identifier associated with each entry on the ledger 500. |
| 530 | Transaction Record | A ledger record 520 in which information relating to a transaction 70 is posted to the ledger 500. Examples of the information that can be included in the transaction record 530 can include but are not limited to the parties 100 to the transaction, the consideration 71 (both non-monetary 72 and monetary 74), the date, an expense authorization 96 or expense code 97. In a preferred embodiments the recording of a transaction record 510 is permanent and irreversible. The only way it can be undone or modified is by the creation of a subsequent transaction record 530 that "zeroes out" the prior record. |
| 540 | Settlement Record | A ledger record 520 that is recorded upon the execution of a settlement 80 |
| 550 | Use Record | A ledger record 520 that is recorded relating to the use 68 an asset or service constituting non-monetary consideration 62. |
| 560 | Credit Record | A ledger record 520 that is recorded relating the issuance or utilization of a credit 88. |

III. Overview

The system 200 is an IT platform 210 with a ledger 500 that can selectively be accessed by the parties 100 participating in the system 200. The IT platform 210 enables more efficient communications and interactions across other information silos, applications, and platforms. Marketplaces such as the business travel market which rely heavily on third-party payors and involve various intermediaries typically involve information silos which hamper the collective process of forming, executing, and closing out transactions 70.

In many instances of business travel, the purchaser and beneficiary of the travel-related services is an employer 110 of the traveler 112. The traveler 112 interacts with the employer 110 in terms of authorizing the travel, complying the applicable policies 92, submitting expense reports 410, and other administrative tasks. However, even though the employer 110 is the ultimate beneficiary of those expenses, the employer 110 has no direct interaction or communication with the various travel vendors 130, such as the airline 132, hotel 134, or rental car company 136. The vendors 130 and employer 110 are not in direct communication with each other, and as a result the employee 112 is forced to support the transactions 70 with a separate bifurcated processes with the vendors 130 and employer 110. The absence of desirable communications and data access between the vendor 130s and employer 110 also has negative impacts on those parties 100 in terms of costs, time, redundant processes, and an inability to monitor business activities in a convenient manner.

The system 200 can integrate with various IT platforms of the vendors 130, employers 110, employees 112, and other parties 100 through a ledger 500 that is selectively accessible to the parties 100 participating in the system 200. This can orchestrate the purchase, validation, payment, settlement, reporting, invoicing, and servicing of airline tickets and hotel reservations for business travelers 112. The system 100 can be managed and operated by a host 160, which is preferably an independent party 100 that does not otherwise participate in the system 200. However, the system 200 can be implemented in such a manner that the host 160 is a vendor 130, an employer 110, or some other entity who both manages the system 200 as well as participates in transactions formed through use of the system 200.

In many embodiments of the system 200, the functionality of the system 200 can be involved through a payment option on the checkout page of the applicable vendor website or mobile app Instead of relying on a credit card authorization 76 from the credit card of the employee 112 of the employer 110 as the primary driver of the transaction, the system 200 can use an expense authorization 96 from the employer 110 that is stored on the ledger 500 and is accessible to the applicable vendor 130 and financial institutions 160. The resulting efficiencies are readily visible in a comparison of FIG. 2A (the system 200) to FIG. 1A (the prior art) and of FIG. 2B (the system 200) to FIG. 1B (the prior art).

The replacement of a credit authorization 76 from a financial institution 150 with an expense authorization 96 from the ultimate payor 110 is all by itself a significant benefit the parties 100 of a transaction 70. When corporate travelers 112 book airline tickets and hotel reservations for work, the prior art uses credit cards as a method of payment, but the credit card approval is a proxy for expense approval (once an expense report is generated from the credit card bill and processed). The system 200 can skip the credit card (and its approval process) and process an expense approval at the time of booking, directly with the corporate buyer's expense system.

The system 200 can disintermediate the credit card, which saves the supplier the 2.5-3% merchant fee. The system 200 can disintermediate the Global Distribution System (aka the GDS, companies such as Sabre, Amadeus, TravelPort, TravelSky), which saves the supplier $3-21 in fees per booking. By cutting out GDSs, parties participating in the system 200 can have the opportunity to sell inventory or buy inventory that the GDS can't display, such as American Airlines Main Cabin+, wifi passes, seat upgrades, lounge passes, mileage multipliers, etc. The system 200 also eliminated the expense report, which can save organizations $1 per booking in fees.

Facilitating communications and data access between the different parties 100 involves facilitating the ability of the IT platform of the various parties to interact with each other.

That means of interaction is facilitated by a ledger 500, which in many embodiments will be a blockchain ledger 502, although a database 504 that is selectively accessible to the applicable parties 100 of the system 200 can also be used.

The system 200 is a superior clearinghouse for transactions 70 than the prior art because of the ability to use the ledger 500 as an interface for processing transactions among disparate computer systems by the various parties 100. Prior art booking and expense reimbursement methodologies involve highly complex transactions between an increasing number of computer systems and platforms. Each of these platforms suffer from drawbacks that prevent their effective use together to efficiently and accurately process and manage service transactions related to service booking and expense reimbursement. The system 200 can enable organizations 110 to create authorizations 90 that can replace the current use of the credit card authorizations. Expense codes to unused ticket value which allows the system 200 to administer that value in an expense compliant manner. The system 200 can implement a peer-to-peer network that contains a universal data model that allows multiple publishers of event data to share that data among all subscribers in one gesture, creating a shared state among all parties 100. The prior art uses a sequence, hand-off, segmented, black-box, pending transaction style of architecture that makes it impossible to have a shared state or single version of the truth accessible to all the appropriate parties.

This approach has the advantage of verifying and distributing the data in one gesture as each transaction is directly or effectively signed by all participants in a cryptographic audit log or blockchain or distributed ledger. Another advantage of this approach is the ability to rewind through the history of the state, as each transition of the state is immutably recorded and shared among all actors. Data is appended vs overwritten or updated in a manner that is similar to the recording of a transactions, liens, and other transactions for real property at the register of deeds.

IV. Prior Art

The benefits of the system 200 and the components and processing of the system 200 that enable those advantages can be better understood by first looking at the prior art.

FIG. 1A is a block diagram illustrating an example of a prior art process by which business travel services 63 are purchased, with the individual 112 purchasing and utilizing the travel doing so on behalf of an organization 110, and with the organization 110 subsequently reimbursing the individual 112 after the submission of an expense report 360. As disclosed in the Figure, there are two processing loops in the prior art: (1) the process loop between the individual 112 and the vendor 130 in which a transaction 60 occurs; and (2) a process loop between the individual 112 and the organization 110 associated with the individual 112 in which the individual 112 submits an expense report 360 to the organization 110 which triggers a reimbursement from the organization 110 to the individual 112. Neither loop directly impacts the other. As illustrated in the Figure, the individual 112 typically uses a credit card authorization 77 to pay the vendor 130, while the organization 110 typically provides its reimbursement to the individual 112 through a bank.

Figure 1B:
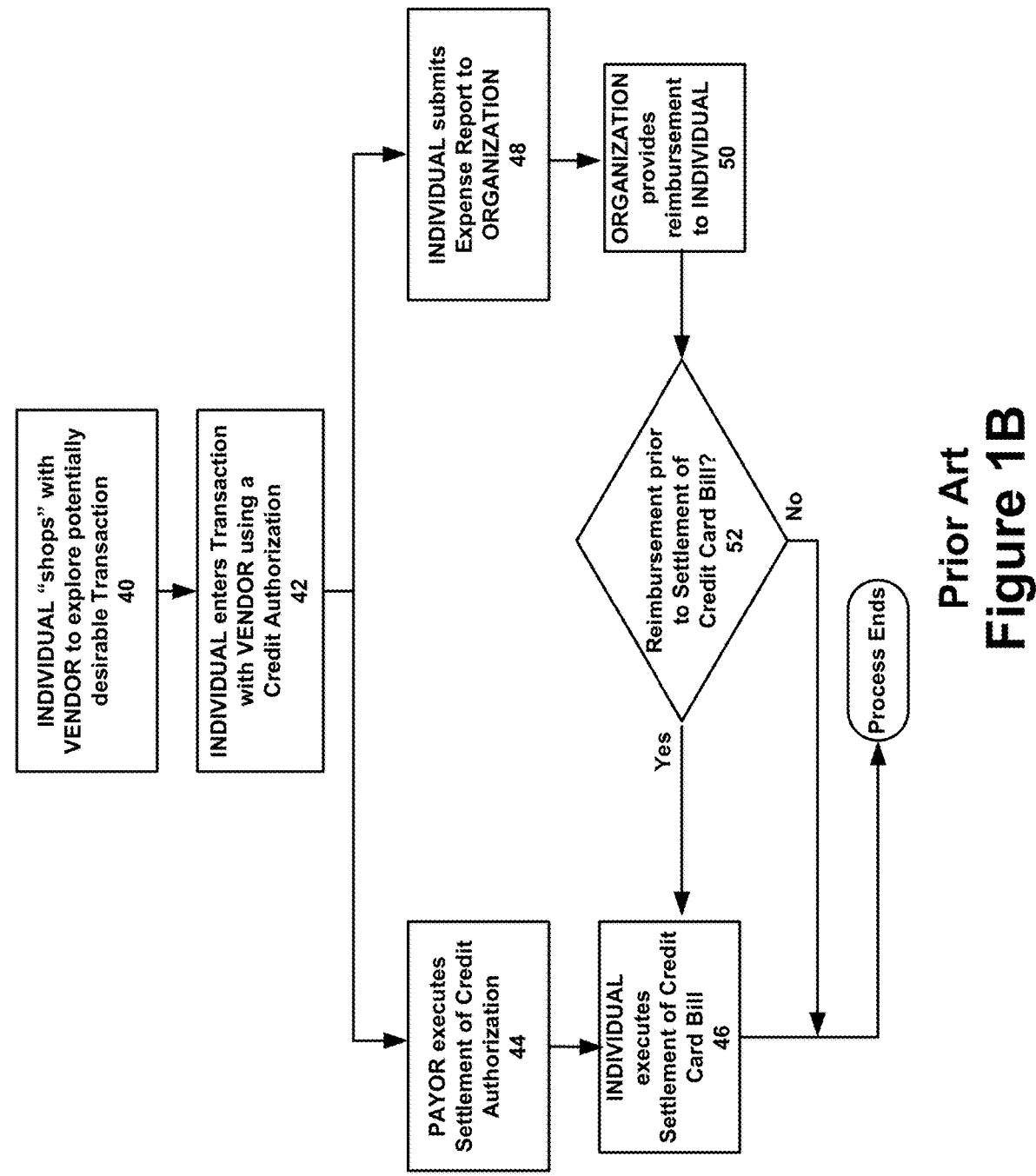
FIG. 1B is a flow chart diagram illustrating an example of a prior art process by which business travel services are purchased, with the individual purchasing and utilizing the travel on behalf of an organization, with the organization subsequently reimbursing the individual after the submission of an expense report.

FIG. 1B is a flow chart diagram illustrating an example of a prior art process by which business travel services 63 are purchased, with the individual 112 purchasing and utilizing the travel on behalf of an organization 110, with the organization 110 subsequently reimbursing the individual 112 after the submission of an expense report 360. FIG. 1B is a flow chart that corresponds with the block diagram of FIG. 1A. At 40, the individual 112 shops with the vendor 130 to explore potentially desirable transactions 60. At 42 the individual 112 enters into a transaction 60 with the vendor 130. At that point, the process splits into the two loops discussed above. At 44 the payor 150 such as the credit card company 152 executes a settlement 80 of the credit card authorization 77. This can happen before or after the individual 112 submits the expense report 360 to the organization 110 at 48 and before or after the organization 110 provides reimbursement of the individual.

Figure 1C:
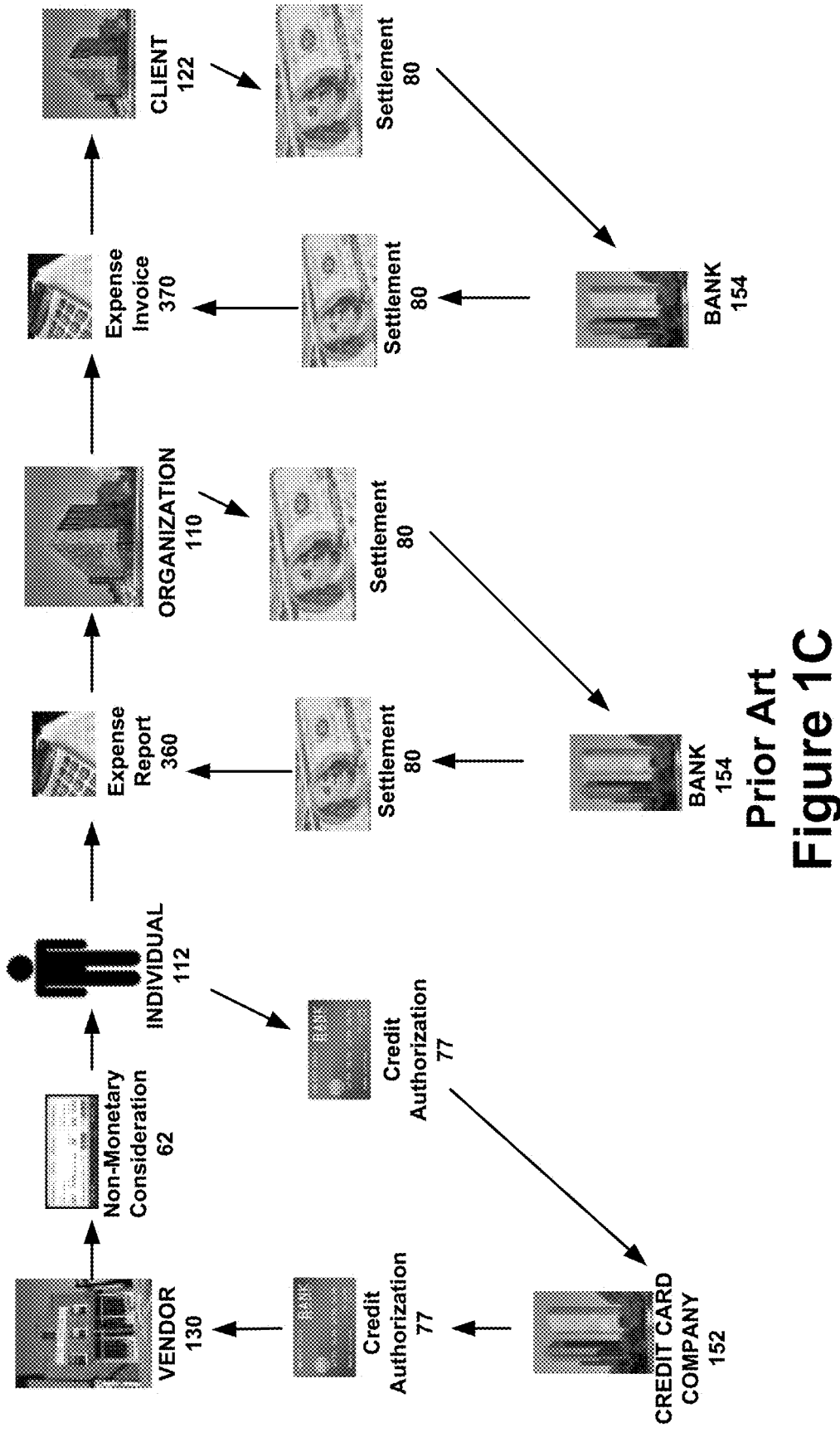
FIG. 1C is a block diagram similar to FIG. 1A, with additional process steps resulting from the context that the organization associated with the traveler is providing consulting services to a client, and the client is the ultimate payor of the expenses.

FIG. 1C is a block diagram similar to FIG. 1A, with additional process steps resulting from the context that the organization 110 associated with the traveler 112 is providing consulting services to a client 122, and the client 122 is the ultimate payor of the expenses. Instead of two processing loops that are substantially independent of each other, there are now three such loops. The individual 112 uses a credit authorization 77 to purchase the non-monetary consideration 62. The individual 112 submits an expense report 360 to the organization 110. The organization 110 sends an expense invoice 370 to the client for reimbursement.

V. Introduction of Elements

A transaction 60 consists of an exchange of consideration 61 between the parties 100. The vendor 130 typically conveys non-monetary consideration 62 to the individual 112, and the individual conveys a promise to pay. Unlike the prior art, the promise to pay is not a credit card authorization 77 but is a more reliable and less risky expense authorization 96 from the organization 110 who is the ultimate backer of the transaction 60.

The system 200 represents a substantial improvement to the processing illustrated in FIGS. 1A-1C. Instead of a chain of reimbursements, the system 100 channels settlement 80 from the ultimate payor (the organization 110 of FIG. 1A or the client 122 of FIG. 1C) to the ultimate recipient of the monetary consideration 70, the vendor 130. This fundamental difference in the flow of a transaction 60 can involve substantial benefits for the parties 100 participating in the system 200.

Figure 2A:
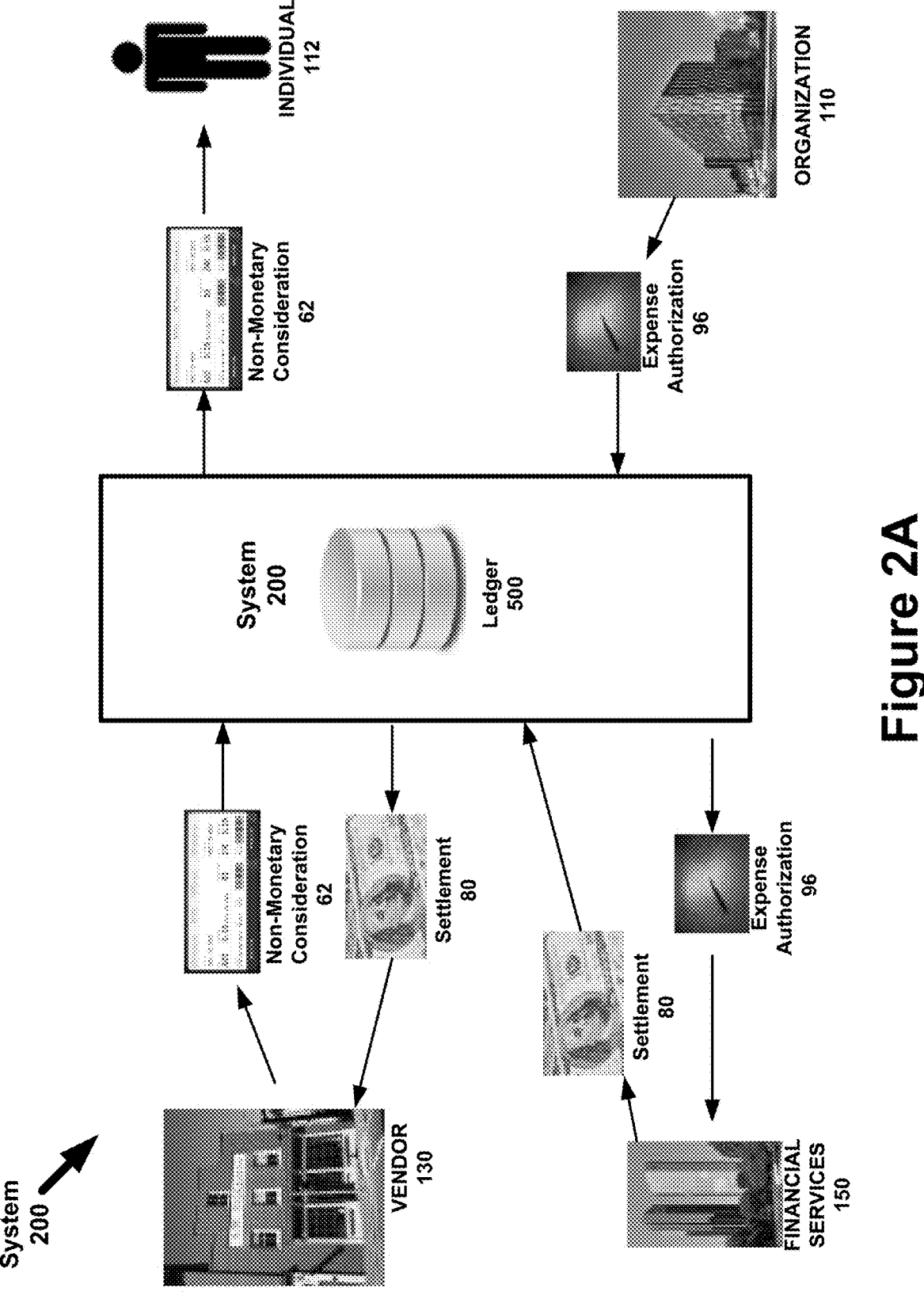
FIG. 2A is a block diagram illustrating an example of a system being used by an individual to purchase non-monetary consideration for which an organization associated with the individual is the payor.

FIG. 2A illustrates how use of the system 200 can improve the processing of FIG. 1A. FIG. 2A is a block diagram illustrating an example of a system 100 being used by an individual to purchase non-monetary consideration 62 for which an organization 110 associated with the individual 112 is the ultimate payor. The individual 1121 receiving the non-monetary consideration 62 is not the ultimate payor of the transaction 60, and as such the individual 112 is involved in any kind of settlement 80 or reimbursement. An expense authorization 96 from the organization 110 is used to form the transaction 60 with the vendor 130. It is the expense authorization 96 and not a credit card authorization 77 which is used to consummate the transaction 60. A financial services company 150 such as a bank 154 uses the expense authorization 96 on the ledger 500 of the system 200 to facilitate the transfer of money to the vendor 130. All the parties 100 are participants in the system 200 and as such, all of the parties 100 have selective access to the ledger 500 of the system 200 (subject to the processing rules of the system 200 which prevent access to information to which the parties 100 have no reason to access). No chains of expense reports. No chains of reimbursements. No credit cards needed. Just the transfer of money from an account 158 of the ultimate payor (e.g., the organization 110) to the account 159 of the ultimate payee (e.g., the vendor 130).

Figure 2B:
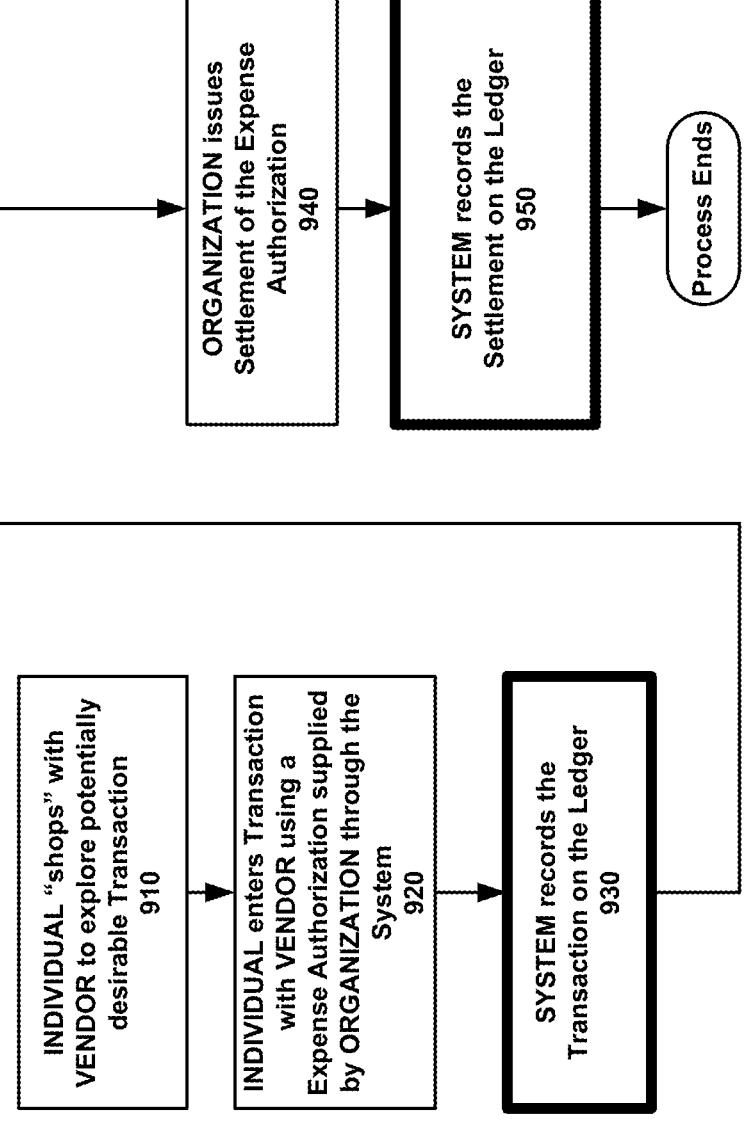
FIG. 2B is a flow chart diagram illustrating an example of a process by which non-monetary consideration is purchased by an individual on the basis of an expense authorization that enables the transfer of money directly from the organization to the vendor.

FIG. 2B illustrates this concept in the form of a flow chart. No two-pronged multi-threaded process, unlike FIG. 1B. FIG. 2B is a flow chart diagram illustrating an example of a process by which non-monetary consideration 62 is purchased by an individual 112 on the basis of an expense authorization 96 that enables the transfer of money directly from the organization 110 to the vendor 130. At 910, an individual 112 shops with the vendor 130 to explore potentially desirable transactions 60. At 920, the individual 112 and vendor 130 enter into a transaction 60. The expense authorization 96 is the promise of payment. The system 200 records the transaction 60 in a transaction record 530 on the ledger 500 at 530. The organization 110 does not wait for an expense report 360. The settlement 80 is issued at 940 in response to the recording of the transaction record 530. The settlement 80 is recorded as a settlement record 540 on the ledger 500 at 950. Recording information on the ledger eliminates the bifurcated loop of FIG. 1B.

Figure 2C:
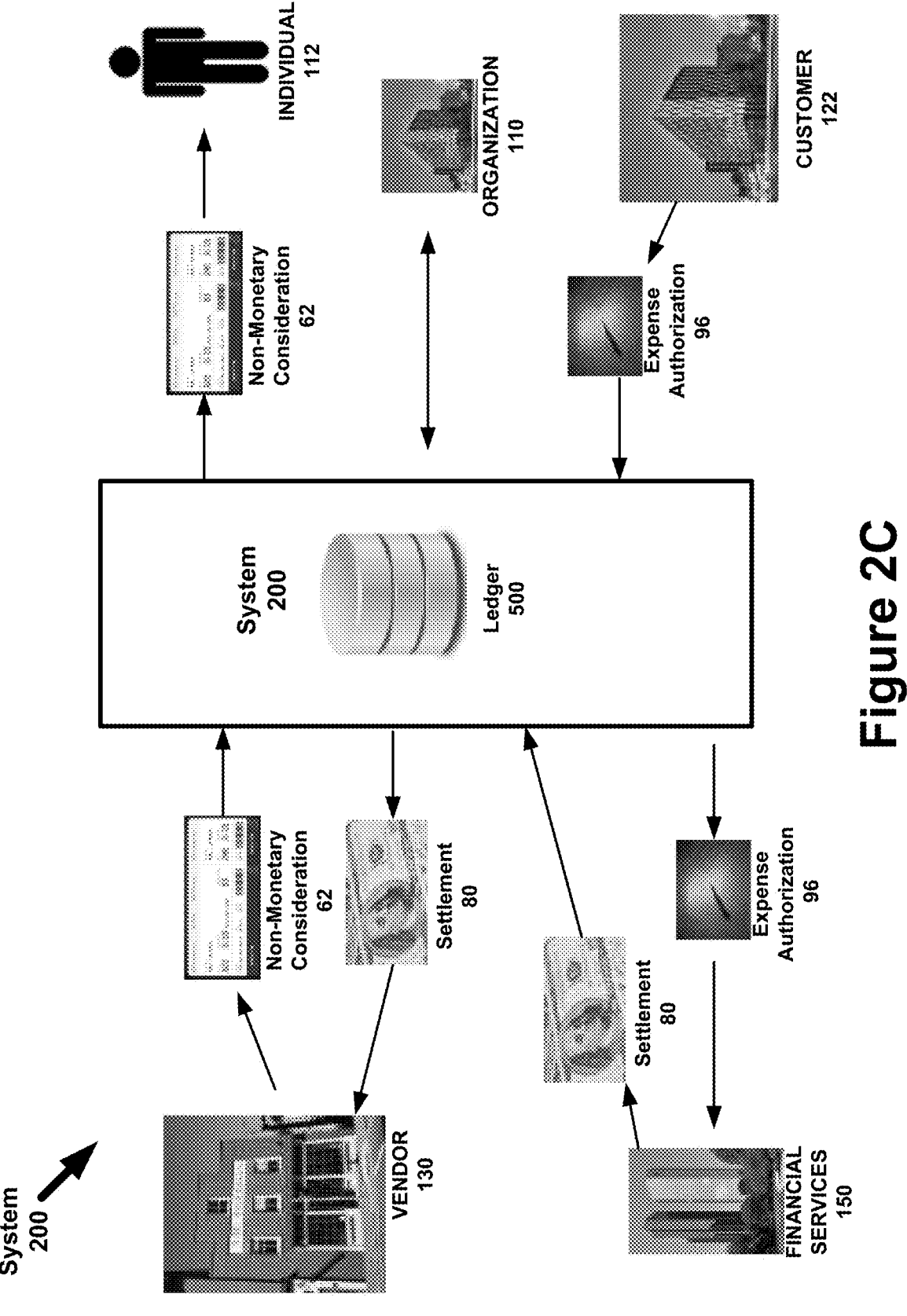
FIG. 2C is a block diagram similar to FIG. 2A, with the additional context of a client receiving consulting services from the organization and the consulting client being the ultimate payor for the expenses.

FIG. 2C is a block diagram similar to FIG. 2A, with the additional context of a customer 122 receiving consulting services from the organization 110 and the consulting client 122 being the ultimate payor for the expenses. This is in sharp contrast to the chain of payments from customer 122, to organization 110, to individual 112, and to vendor 130 that is illustrated in FIG. 1C.

VI. Interaction Through it Platforms

Figure 3A:
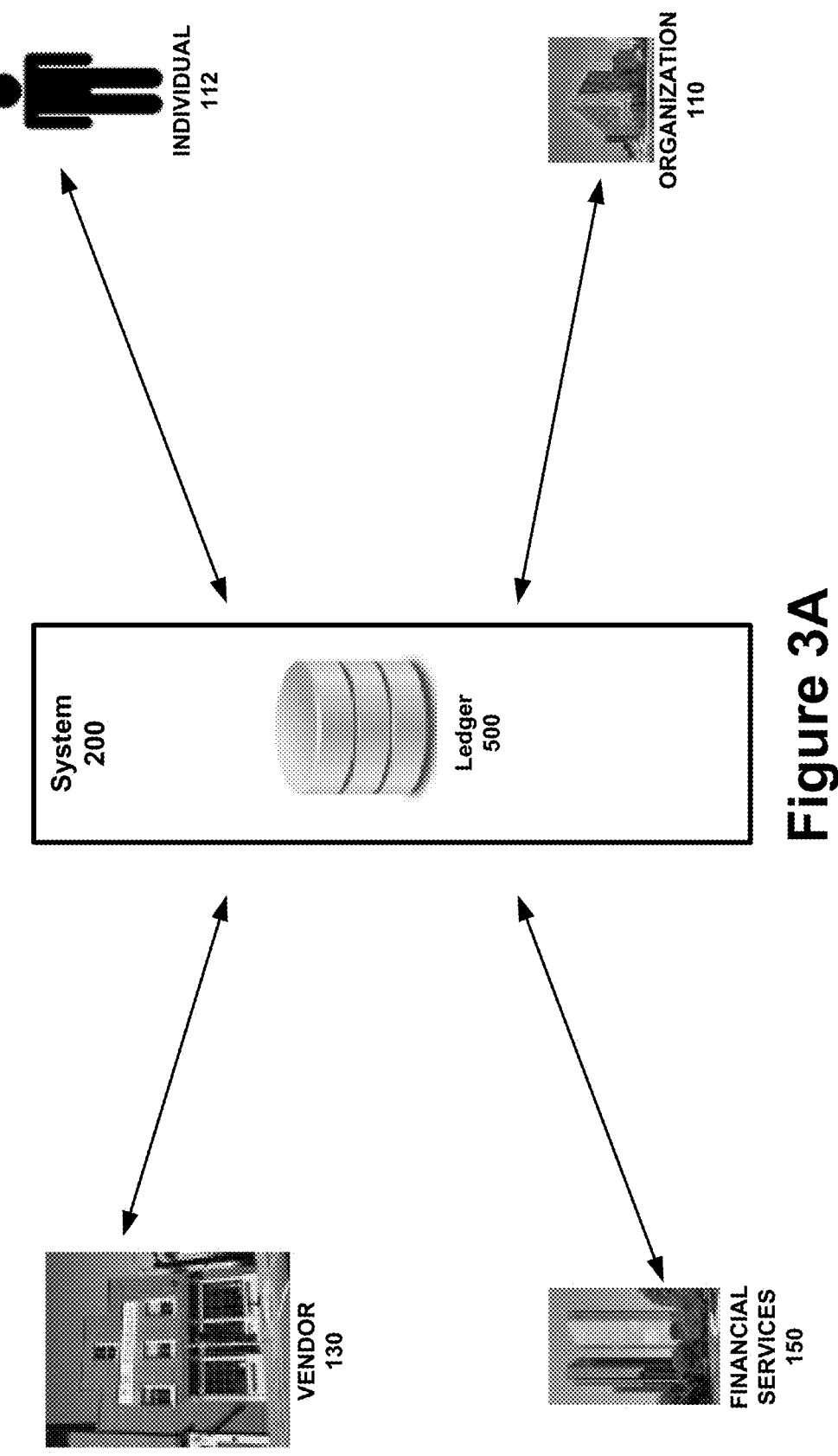
FIG. 3A is a block diagram illustrating an example of different parties interacting with each other through their interactions with the system, with the system including a ledger for the recording and accessing of information relevant to the handling of the transaction.

The functionality of the system 200 is based on the ability of the parties 100 to interact with each other in the context of a common ledger 500 that records transactions 60, settlements 80, and in some embodiments usage 68 and credits 88. FIG. 3A is a block diagram illustrating an example of different parties 100 interacting with each other through their interactions with the system 200, with the system 200 including a ledger 500 for the recording and accessing of information relevant to the handling of the transactions 60. The mechanisms to manage the interactions of the parties 100 is the interaction of their respective IT platforms 210 with the IT platform 210 of the system 200, which is managed and operated by a host 160.

Figure 3B:
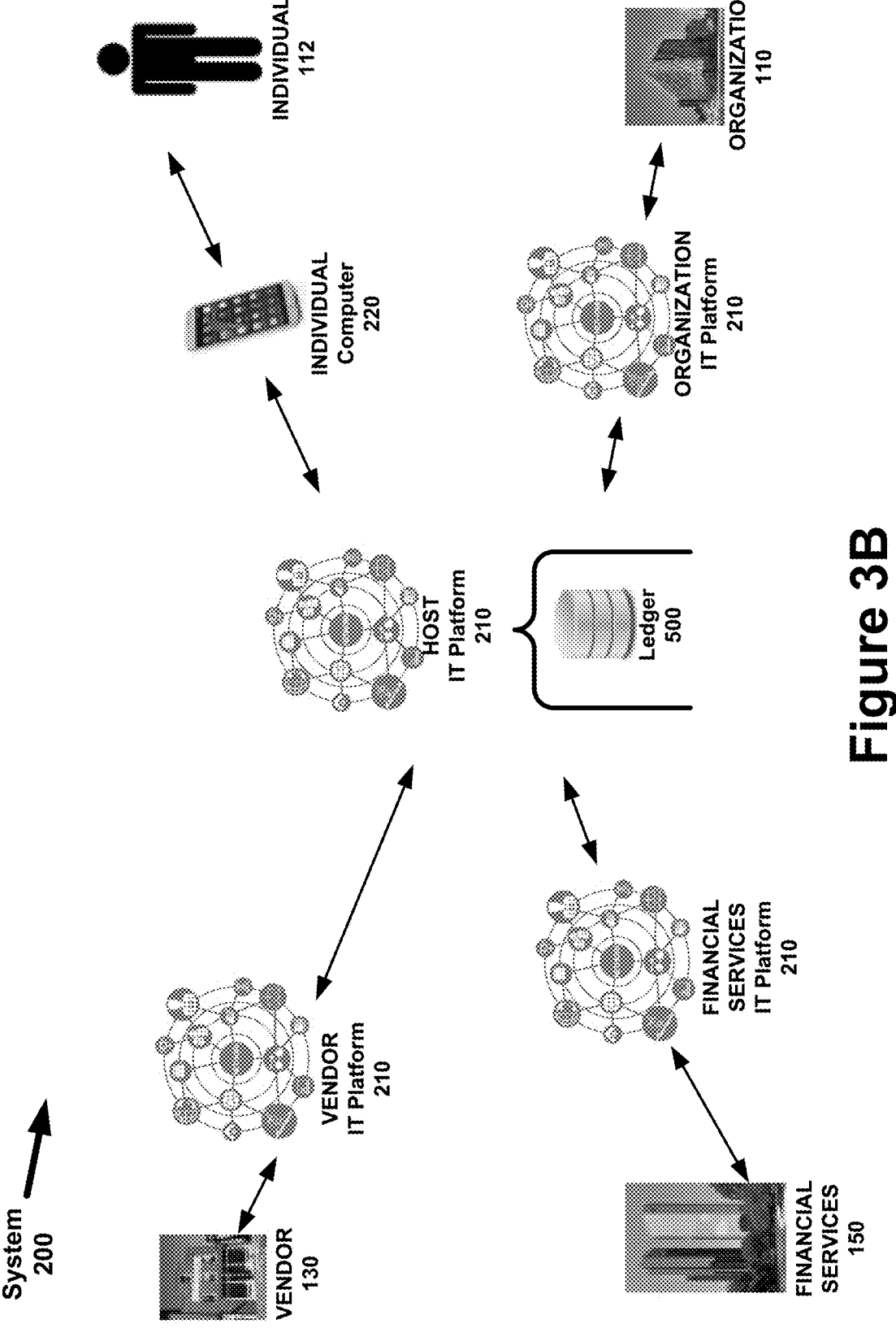
FIG. 3B is a block diagram illustrating an example of different parties interacting with each other through the interactions of their respective IT platforms with the IT platform of the system.

FIG. 3B is a block diagram illustrating an example of different parties 100 interacting with each other through the interactions of their respective IT platforms 210 with the IT platform 210 of the system 200. In many embodiments, the system 200 is an overlaying interface between the information silos of the parties 100. Many vendors 130 already have sophisticated IT platforms 210 to facilitate the sale of their goods and services. The same is true for financial services organizations 150 such as banks 154, as well as various organizations 110 such as businesses, government agencies non-profit organizations, etc. The system 200 takes advantage of that existing architecture and does not supplant any of it. Rather, the system creates an interfacing IT platform 210 that can interact with the others, and function as a clearinghouse for activities between the participating parties 100. The ledger 500 is used to store information that is relevant and helpful to that clearinghouse functionality. The ledger 500 is used to make available the necessary information to eliminate wasteful processes that cost time and money.

Figure 3C:
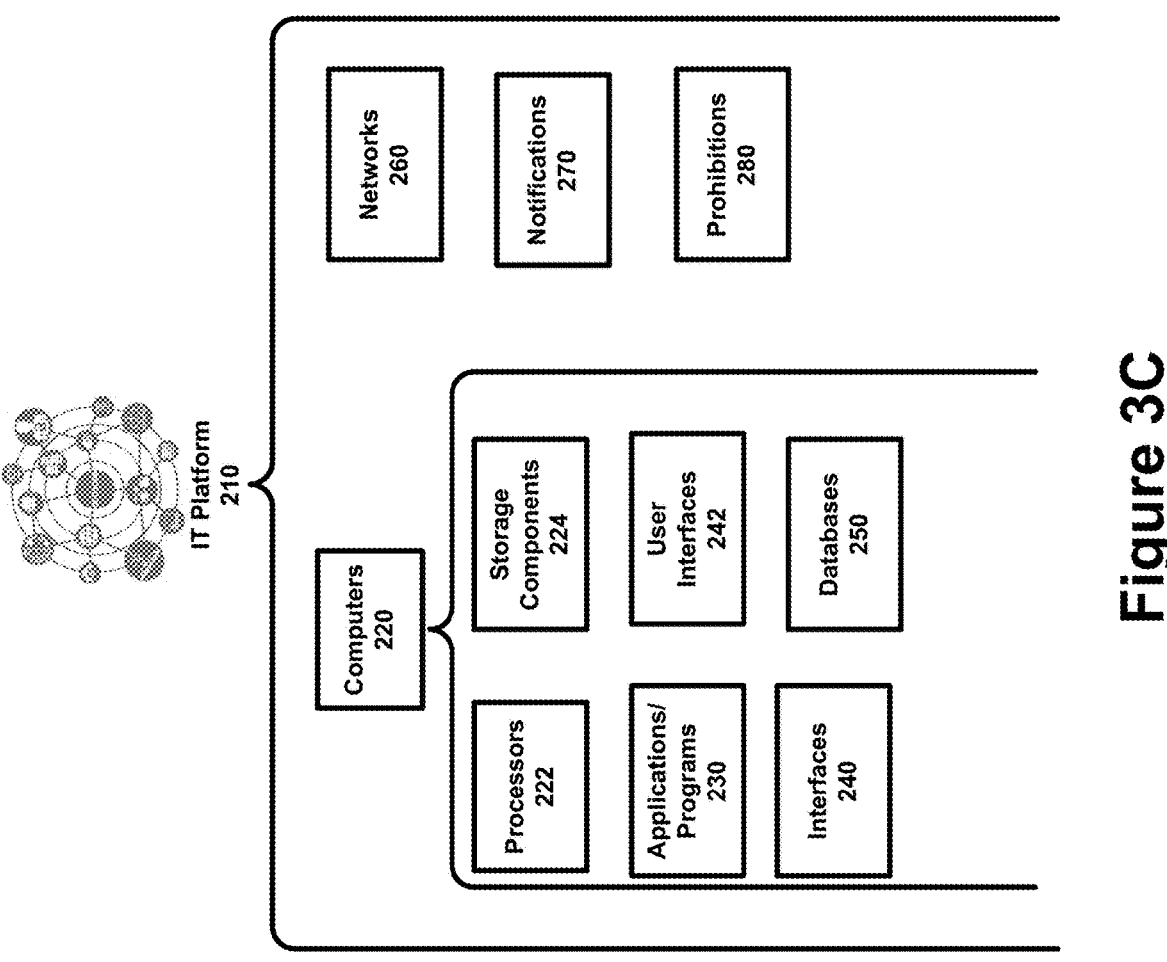
FIG. 3C is a diagram illustrating an example of different components that can be included in an IT platform used by the host, vendors, organizations, and other parties participating in the system.

FIG. 3C is a diagram illustrating an example of different components that can be included in an IT platform 210 used by the host 160, vendors 130, organizations 110, and other parties participating in the system 200. The system 200 can flexibly accommodate a wide range of different IT platforms 210 with varying degrees of complexity and potentially extra levels of proactive validation beyond the recording of ledger records 520 on the ledger 500. A wide range of computers 220 can be used, with varying processors 222, storage components 224, applications/programs 230, user interfaces 242 interfaces 240, and databases 250. Different networks 260 can connect the computers 260 and other devices together. Such platforms can be configured by the system 200 to send and receive various notifications 270 as well as to inform or request certain prohibitions.

The "footprint" of the system 200 can vary widely. If the host 160 is a prominent vendor 130, travel portal 142, or other participating party 100, the system 200 can be the IT platform 210 that users 101 visit to initiate transactions. On the other end of the continuum, the system 200 can be implemented with a small "footprint" using a widget on the websites or platforms of participating parties 100. Participating individuals 112 can invoke the system 200 when checking out on a vendor 130 IT platform 210, but with most of the processing being performed on the vendor 130 site.

Current computerized booking and expense reimbursement methodologies involve highly complex transactions between an increasing number of computer systems and platforms. Each of these platforms suffer from drawbacks that prevent their effective use together to efficiently and accurately process and manage service transactions related to service booking and expense reimbursement but the ledger 500 of the system 200 can alleviate those weaknesses.

The functionalities described of the system 200 may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The system 200 is implemented in a highly automated clearinghouse platform 210 configured to send to and receive service-transaction related data from the component systems. The service-transaction related data may be communicated via one or more application programming interfaces (APIs) and/or software widgets integrated with the component systems.

As used herein, the term "service transaction" and its derivatives generally refers to transactions related to services provided by one or more of the service provider systems. The service transactions may include, for example, booking-related service transactions, such as transactions for booking, purchasing, etc. a hotel, flight, rental vehicle, or other goods or services via the service provider system, whether directly or indirectly. The system is primarily focused on expenses which can be expensed to a different party. The service transactions may also include, for example, expense-related service transactions, such as transactions for settling payment for the good or service via the service provider system, whether directly or indirectly.

The system is generally configured to generate, update, and otherwise manage a transaction record, which records the service-transaction related data that drives the logic of one or more of the component systems. In particular, the ACH system collects travel, expense, and payment events from travel suppliers, sellers, aggregators, settlement organizations, corporate buyers, duty-of-care platforms, reporting platforms, calendar platforms, customer and agent service providers and their relevant platforms—in order to sequence these events in the appropriate order, verify them, and distribute them among component systems and/or platforms, thus minimizing the errors and inefficiencies typically associated with booking and expense reimbursement methods.

The system may be a server system that includes one or more system computers connected to the network. Each system computer may include computer components, including one or more processors, memories, displays and interfaces, and may also include software instructions and data for executing the functions of the ACH system and/or platform described herein. The ACH system may also include one or more storage devices configured to store large quantities of data and/or information, and may further include one or more databases. For example, the storage device may be a collection of storage components, or a mixed collection of storage components, such as ROM, RAM, hard-drives, solid-state drives, removable drives, network storage, virtual memory, cache, registers, etc. The storage device may also be configured so that the system computers may access it.

The service provider systems may be computer systems of service providers, which may be supported by service provider servers, and which are generally configured to support online platforms via which services of the service provider may be booked or otherwise provided. The service provider systems may include one or more service provider computers connected to the network. Each service provider computer may include computer components, such as one or more processors, memories, displays and interfaces, and may also include software instructions and data for executing the functions of the service provider computer systems and/or platforms, as is known in the art. The service provider computer systems, including components, services, databases, software and platforms thereof, may be accessible to the ACH system, and/or vice versa and/or other component systems, via one or more application programming interfaces (APIs) and/or software widgets.

The service provider systems may include one or more booking-related service provider systems, which are generally configured to support online booking-related platforms, such as those of travel agencies, on-line booking services (e.g., Kayak, Expedia, etc.), vehicle rental companies (e.g., Enterprise Rent-A-Car, Hertz, etc.), airlines, hotels, etc., via which users can directly or indirectly book or otherwise purchase expensable goods or services provided by the service providers. The service provider systems may also include one or more expense-related service provider systems, which are generally configured to support online expense-related platforms, such as those of settlement organizations (e.g., PayPal, etc.), banks, etc., via which payment for the expensable good or service may be settled, whether directly or indirectly.

The corporate systems may be computer systems of business organizations or other entities, which may be supported by organization servers, and which are generally configured to support business services and/or platforms of the business organization. The corporate computer systems may include one or more corporate computers connected to the network. Each corporate computer may include computer components, such as one or more processors, memories, displays and interfaces, and may also include software instructions and data for executing the business services of the business organization, as is known in the art. The corporate computer systems, including components, services, databases, software and platforms thereof, may be accessible to the ACH system and/or other component systems, and/or vice versa, via one or more application programming interfaces (APIs) and/or software widgets.

The user devices are generally computing devices of users affiliated with one or more of the business organizations. The user devices may be mobile (e.g., laptop computers, tablet computers, smartphones, PDAs, wearables, etc.) or stationary (e.g., desktop computers, etc.) devices connected to the network, and generally provide the user with the ability to interact with one or more of the service provider systems via the respective platforms of the service providers to book, purchase, etc., the goods or services respectively provided by the service providers.

The user devices may access the ACH system (directly or indirectly) and/or other component systems, including components, services, databases, software and platforms thereof, and/or vice versa, via one or more application programming interfaces (APIs) and/or software widgets. Such user interaction may be via a graphical user interface, as is generally known in the art. The user devices may include computer components, such as one or more processors, memories, displays and interfaces, and may also include software instructions and data for executing the functions of the user devices.

The processors may instruct the computer components to perform various tasks based on the processing of information and/or data that may have been previously stored or have been received, such as software instructions and/or data stored in the memory(s). The processors may be standard processors, such as a central processing unit (CPU), or may be dedicated processors, such as an application-specific integrated circuit (ASIC) or a field programmable gate array (FPGA), or a graphical processing unit (GPU).

The memories may store at least software instructions and/or data that can be accessed by the processors. For example, the memories may be hardware capable of storing information accessible by the processors, such as a ROM, RAM, hard-drive, CD-ROM, DVD, write-capable, read-only, etc. The set of instructions may be included in software that can be implemented on the computers. It should be noted that the terms "instructions," "steps," "algorithm," and "programs" may be used interchangeably. The data can be retrieved, manipulated or stored by the processors in accordance with the software instructions or other sets of executable instructions. The data may be stored as a collection of data. Accordingly, the computers may include one or more respective software applications, stored in respective memories, which software applications, when executed by the processors configures the computers to execute the various functions described herein The displays may be any type of device capable of visually communicating data, such as a liquid-crystal display ("LCD") screen, a plasma screen, etc. The interfaces allow users to communicate with the computers and may be a physical device (e.g., a port, a keyboard, a mouse, a touch-sensitive screen, microphone, camera, a universal serial bus (USB), CD/DVD drive, zip drive, card reader, etc.) and/or may be virtual (e.g., a graphical user interface "GUI," etc.).

The network may be any type of network, wired or wireless, configured to facilitate the communication and transmission of data, instructions, etc. from one component to another component of the network. For example, the network may be a local area network (LAN) (e.g., Ethernet or other IEEE 802.03 LAN technologies), Wi-Fi (e.g., IEEE 802.11 standards, wide area network (WAN), virtual private network (VPN), global area network (GAN)), any combination thereof, or any other type of network.

It is to be understood that the configuration illustrated in FIG. 1 serves only as an example and is thus not limited thereto. The various illustrated systems and the system environment, for instance, may include numerous other components, or more than one of each component, connected to network, and the network may be connected to other networks. As discussed, the systems may be implemented via computer executed software, appropriately programmed hardware, or any combination thereof. As such, the various functionalities of the systems may be understood in terms of computer executed software modules in accordance with respective system architectures.

VII. Usage and Credits

Some embodiments of the system 200 can include the functionality of tracking the usage 68 of assets or services and tracking the issuance of credits 88 for unused items and services.

Figure 4A:
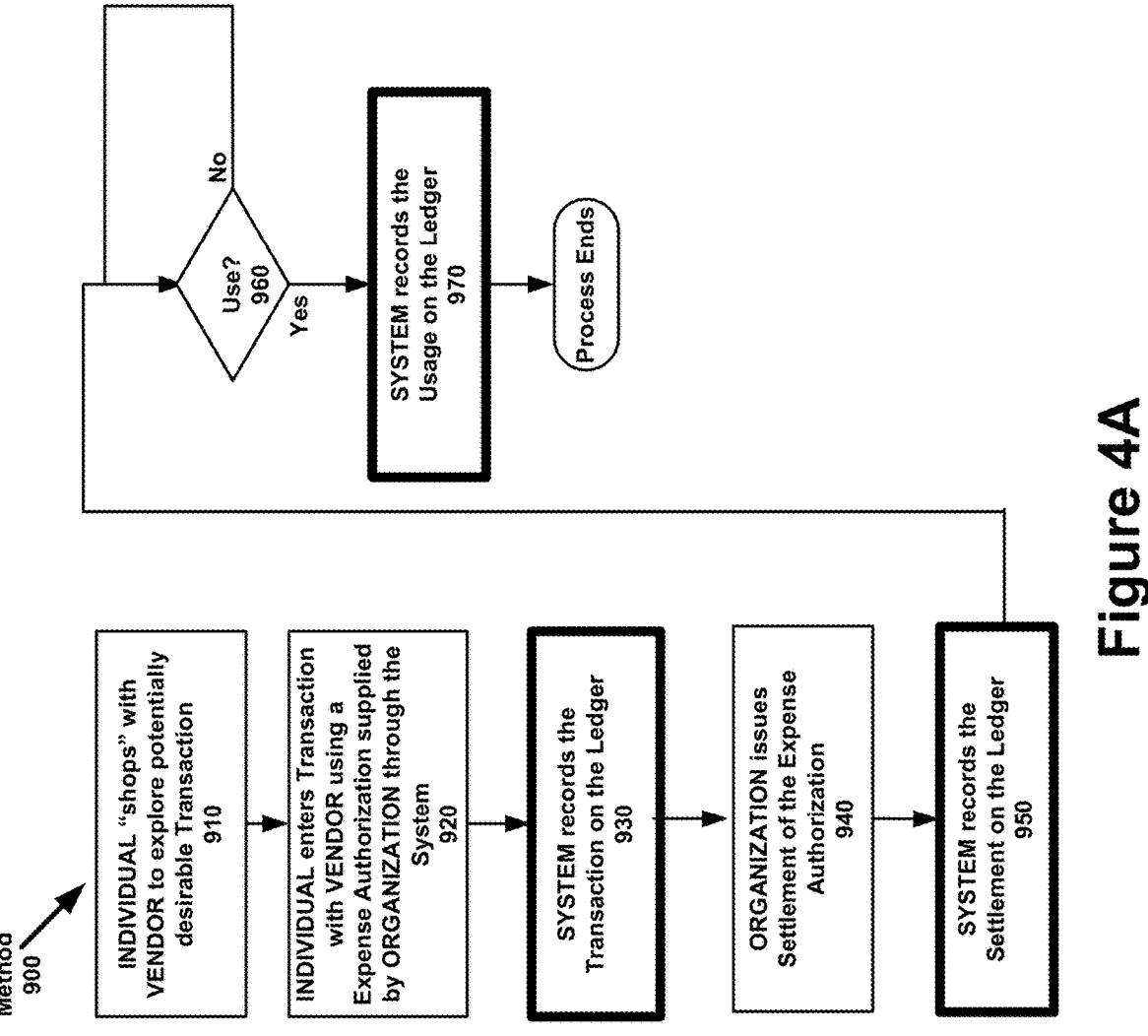
FIG. 4A is a flow chart diagram illustrating an example of a system in which the usage of the assets and services making up the non-monetary consideration of a transaction are monitored and recorded in the ledger of the system.

FIG. 4A is a flow chart diagram illustrating an example of a system 200 in which the usage 68 of the assets and services making up the non-monetary consideration 62 of a transaction 60 are monitored and recorded in the ledger 500 of the system 200. FIG. 4A identical to FIG. 3B except that it includes additional steps. At 960, the system 200 checks to see whether the non-monetary consideration 62 has been used. At 970, the usage 970 can be recorded on the ledger 500 as a use record 550.

Figure 4B:
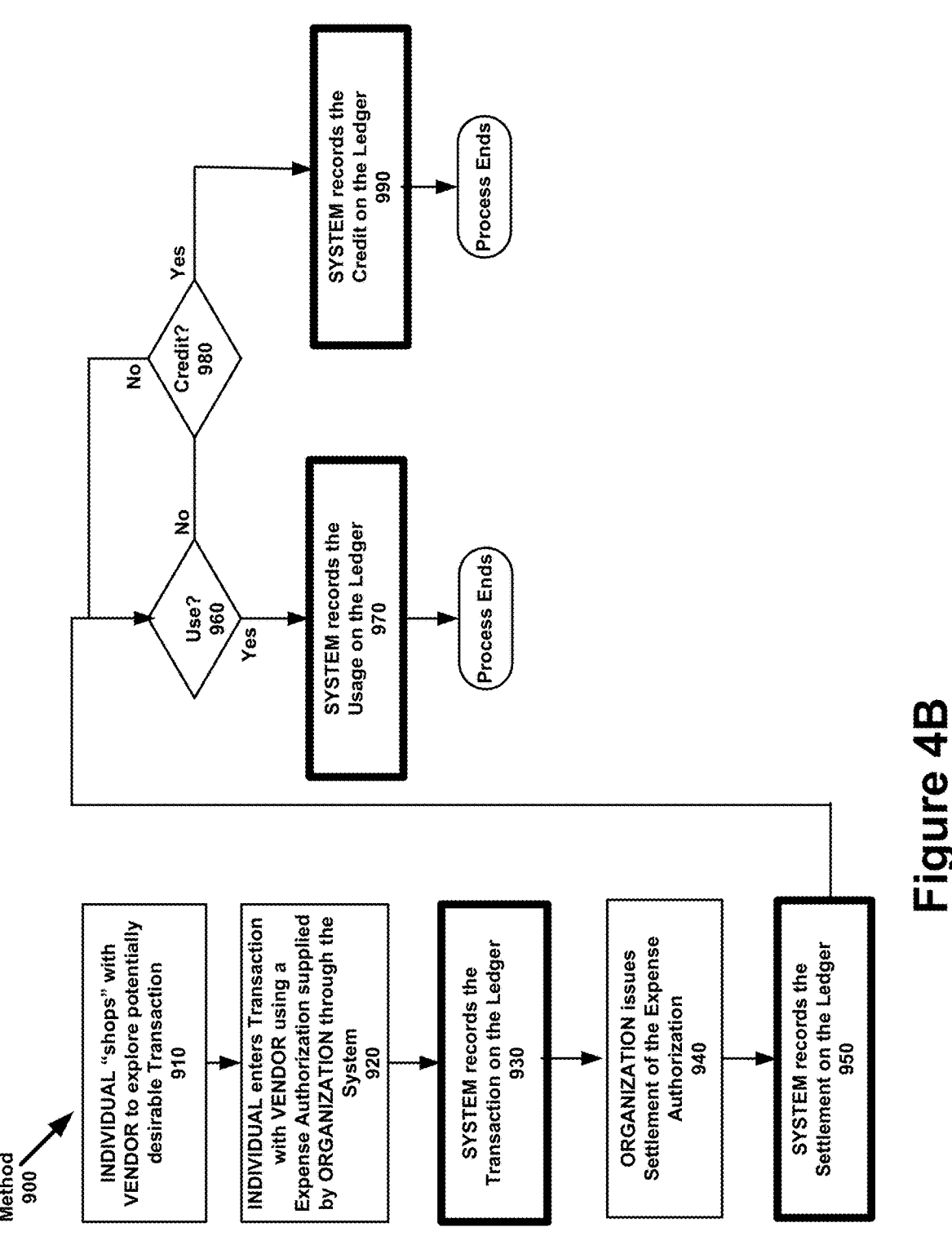
FIG. 4B is a flow chart illustrating an example of a system in which credits from unused assets and services can be recorded on the ledger of the system.

FIG. 4B is a flow chart illustrating an example of a system in which credits 88 from unused assets and services can be recorded on the ledger 500 of the system 200. FIG. 4B is identical to FIG. 4A except with additional steps of determining at 980 whether a credit 88 is owed and recording a credit 88 on the ledger 500 as a credit record 560.

Figure 4C:
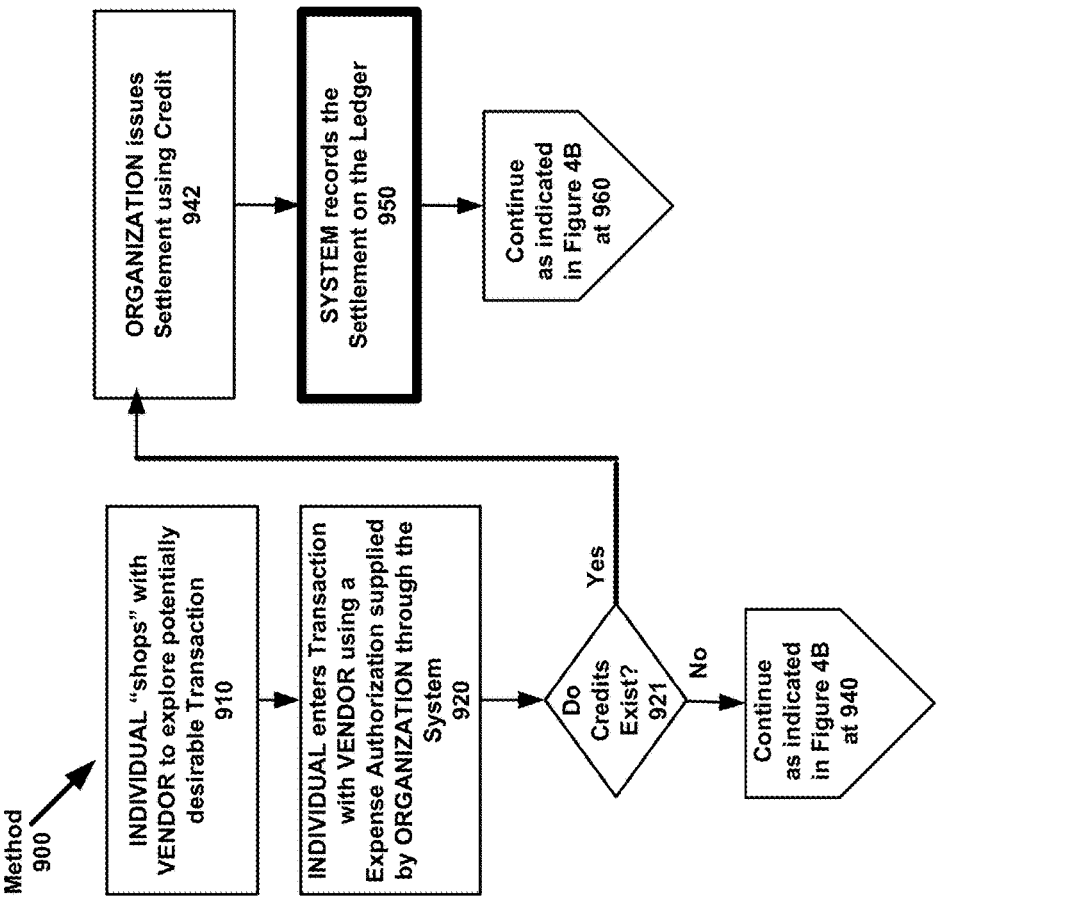
FIG. 4C is a flow chart illustrating an example of a system in which credits from unused assets and services can be used for new purchases using the system.

FIG. 4C is a flow chart illustrating an example of a system in which credits 88 from unused assets and services can be used for new purchases using the system 200. The process closely resembles any other transaction process, with the credit record 560 linking back to the original expense authorization 96 and expense code 97. At 910, the individual shops 910 to enter into a transaction 60 at 920. If credits 88 exist at 921, they can be used at 942 and their use can be recorded at 950.

Although not indicated in in the figure, the system 200 can be implemented in such a manner that the shopping step at 920 is impacted by things such as available credits 88, usage 68 of past transactions 60, expense codes 97, user profiles, system history, etc. For example, the system 200 can be configured in such a manner as to force an individual 112 to use available credits 88 before other forms of settlement. Organization policies 92 can also impact preferred vendors, what options are available to the individual 112, etc. Attributes of the services or goods themselves can also impact user selections. For example, the length of a flight, the cost of a ticket, the time of day, time of year etc. can be selectively used to filter options available to the individual 112 or to encourage certain behaviors.

VIII. Example #1

Figure 5A:
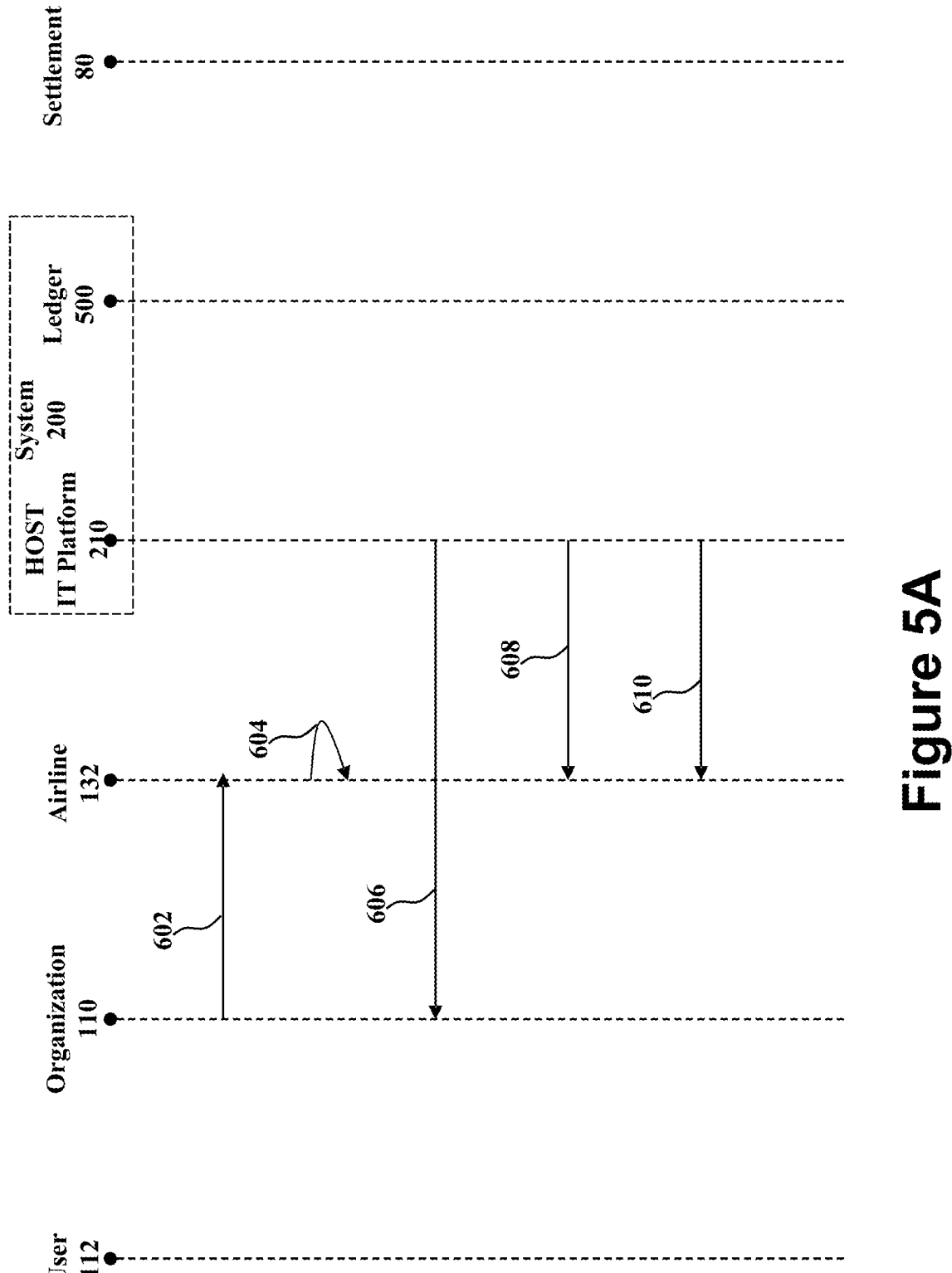
FIG. 5A is an architecture diagram illustrating an example of the system being used to process a transaction.
Figure 5B:
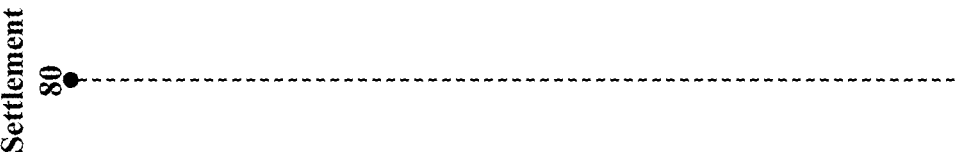
FIG. 5B is an architecture diagram illustrating a continuation of the process that began in FIG. 5A.
Figure 5C:
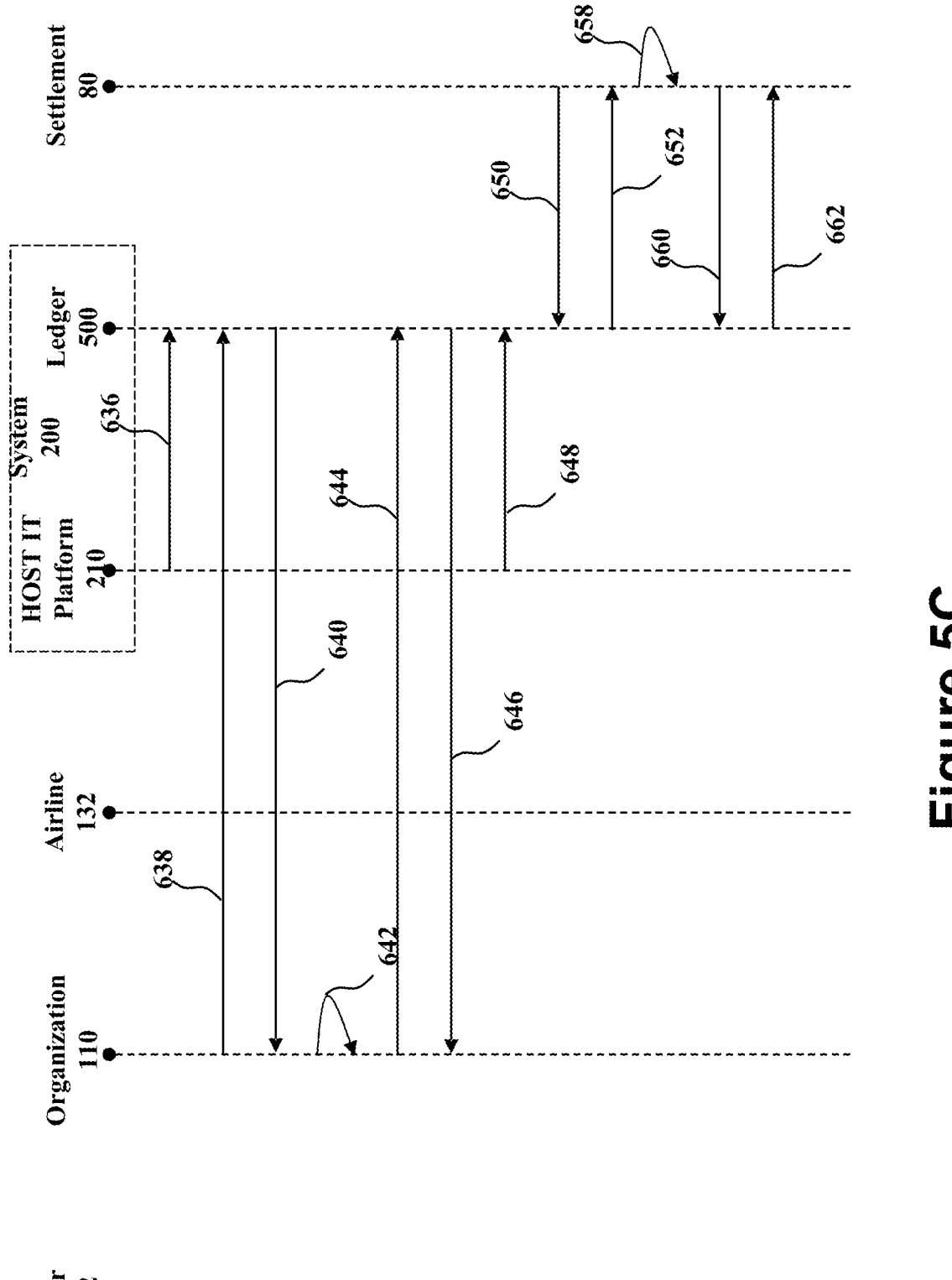
FIG. 5C is an architecture diagram illustrating an example of the process that began in FIG. 5A and was continued in FIG. 5B.

FIG. 5A is an architecture diagram illustrating an example of the system 200 being used to process a transaction 60. FIG. 5B is an architecture diagram illustrating a continuation of the process that began in FIG. 5A. FIG. 5C is an architecture diagram illustrating an example of the process that began in FIG. 5A and was continued in FIG. 5B. The exemplary operation reflects a simple use case scenario with respect to an airline system. It will be understood, however, that the simple use case is provided solely for the purpose of illustrating the principles of the systems and methods disclosed herein.

At 602, the IT platform 210 for the organization 110 (which can also be referred to as a corporate system) transmits or otherwise establishes travel policies with the airline system. The travel policies regulate which goods or services, or classes thereof, can be properly expensed and the respective users or classes of users may be authorized for. For example, the organization may have two classes of potential users: executive and non-executive, and the travel policy may permit executive users, but not the non-executive users, to travel first class. The establishment of these travel policies may be periodic or on-demand but are generally updateable to reflect current policies.

At 604, the IT platform 210 for the airline 132 sets corporate rates/fares with respect to the organization and provides for accepting alternative forms of payment (i.e., not user credit card) for goods and services booked by the user via the airline system platform.

At 606 and 608, the IT platform 210 for the host 160 establishes API connection with corporate system and with the airline system. As discussed herein, the API connection permits the transfer of service-transaction related data for verification and other purposes.

At 610, the IT platform 210 for the host 160 uses the API connection to incorporate a system widget within the airline system platform. The system widget is a software application that is configured to collect user-expense data from the airline system in connection with the booking of a fight by the user via the airline system platform. In some embodiments, the system widget is configured to display an interactive window via the airline system platform (e.g., website) where the user may enter the user-expense data. In other embodiments, the system widget is not visible to the user and is instead configured to gather the user-expense data automatically from the airline system platform.

At 612, the airline system offers the corporate rates/fares to the user via the airline system platform.

At 614, the individual traveler and user, via the operation of the user device to access the airline system platform, selects a flight for booking and provides the user-expense data. The user-expense data may include data related to the user that may be used by the corporate system verify that the user is authorized by the organization to book the service (i.e., to make the service transaction) and subsequently expensed.

At 616, the user-expense data and service data relating to reimbursable expenses is transmitted to the system 200 for confirmation that the user is authorized by the organization 110 to book the expensed service. The service data is data relating to the service that may be used by the corporate system to verify that the user is authorized to book and expense the service.

At 618, the IT platform 210 for the host 160 requests confirmation from the corporate system that the service transaction is authorized. In at least one embodiment, this involves the host platform 210 transmitting all or some of the user-expense data and/or the service data (i.e., service transaction related data) to the corporate system for verification against travel policies and user profiles stored by the corporate system.

At 620, the airline system confirms authorization or rejects it, as the case may be, based on a comparison of the service-transaction related data with travel polices and user profiles. The airline system transmits the authorization or rejection, as the case may be, to the host platform 210.

At 622, the host platform 210 relays the authorization or rejection to the airline.

At 624 and 626, the host platform 210 generates a unique identifier assigned to the service transaction and transmits the unique identifier to the airline system.

At 628 and 630, the airline system associates the unique identifier with its passenger name record (PNR) or other internal identifier, if any, and confirms the booking with the user via the airline system platform (e.g., website). This may involve displaying or otherwise sending the user a confirmation of the booking via the user device.

At 632, the airline system transmits booking-confirmation data to the system 200 ledger 500 for recording of the service transaction (i.e., the confirmed flight booking) on the blockchain. This creates a transaction record for the service transaction, which is stored on the ledger 500. The transaction record may include the unique identifier, as well as any service-transaction related data, and a status indicator. The status indicator for new transaction records may be "new."

At 634, the system 200 confirms successful recording of the service transaction on the ledger 500 and transmits confirmation of the successful recording to the airline system.

At 636, the host platform 210 periodically queries the ledger 500 to identify service transactions from associated transaction records based on their status indicators, unique identifiers, and/or any other feature. These transaction records may be utilized for reporting information to the DOC system, and/or other auditing and reporting systems. Such queries may be periodic, or on-demand.

At 638 and 640, the platform 210 for the organization 110 queries the blockchain to identify "new" service transactions, and the system 200 may provide the transaction records of such identified services transactions in response.

At 642, the organization platform 210 generates an expense-payable file based on the unique identifiers, and associated service transactions identified from the blockchain. The corporate system may then generate invoices for the service based on the expense-payable file, which invoices may be provided to third-party payers for settlement.

At. 644, the organization platform 210 transmits a request to the blockchain to update the status of the transaction record to "verified," which indicates that the organization acknowledges that payment of the airline for the associated service transaction will be settled.

At 646, the system 200 changes the status of the transaction record to "verified" in response to the request from the corporate system and transmits a confirmation of the status change to the corporation.

At 648, the system 200 periodically queries the blockchain to identify service transactions from associated transaction records based on their status indicators, unique identifiers, and/or any other feature. These transaction records may be utilized for reporting information to the DOC system, and/or other auditing and reporting systems. Such queries may be periodic, or on-demand.

At 650 and 652, the platform 210 for the financial services organization 150 in control of the account 158 such as a bank 154 platform periodically queries the ledger 500 to identify transaction records 520 with "verified" status indicators, and the system 200 transmits the "verified" transaction records to the financial services organization 150

At 654, the settlement organization platform 210, based on receipt of the "verified" transaction records, provides payment to the airline on behalf of the organization for the good or service (i.e., the airfare) booked by the user.

At 660, the settlement organization platform transmits a request to the blockchain to update the status of the transaction record to "settled," which indicates that payment of the airline for the associated service transaction has been settled.

At 662, the system 200 changes the status of the transaction record to "settled" in response to the request from the settlement organization platform and transmits a confirmation of the status change to the settlement organization platform.

It will be understood that the system 200 periodically queries the ledger 500 to identify service transactions from associated transaction records based on their status indicators, unique identifiers, and/or any other feature. These transaction records may be utilized for reporting information to the DOC system, and/or other auditing and reporting systems. Such queries may be periodic, or on-demand. While such queries are disclosed above in relation to other process steps, the queries may be at any time.

IX. Example #2

Figure 6A:
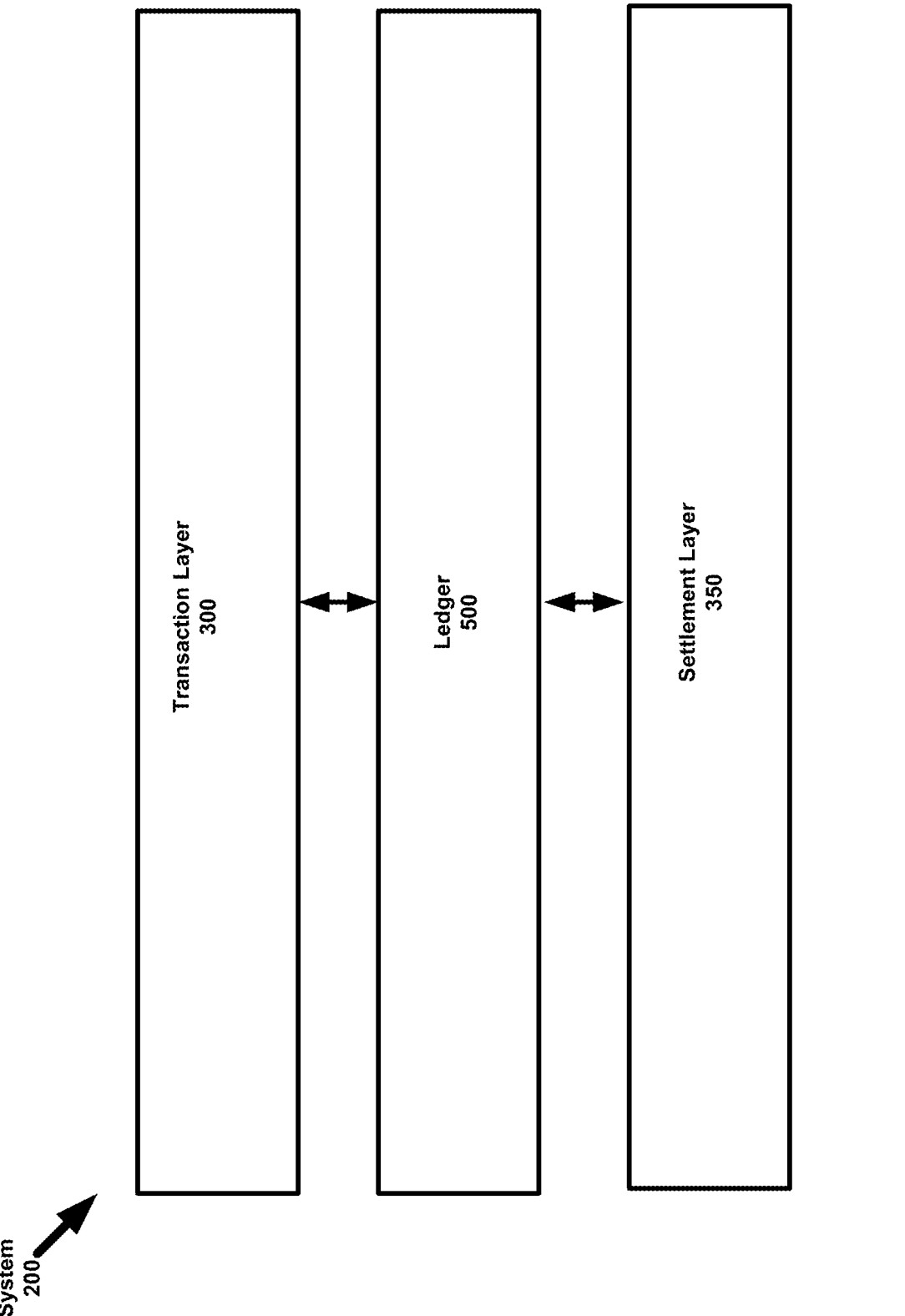
FIG. 6A is a block diagram illustrating an example of the ledger of the system position positioned between a transaction layer and a settlement layer.

FIG. 6A is a block diagram illustrating an example of the ledger 500 of the system 200 position positioned between a transaction layer 300 and a settlement layer 350.

Figure 6B:
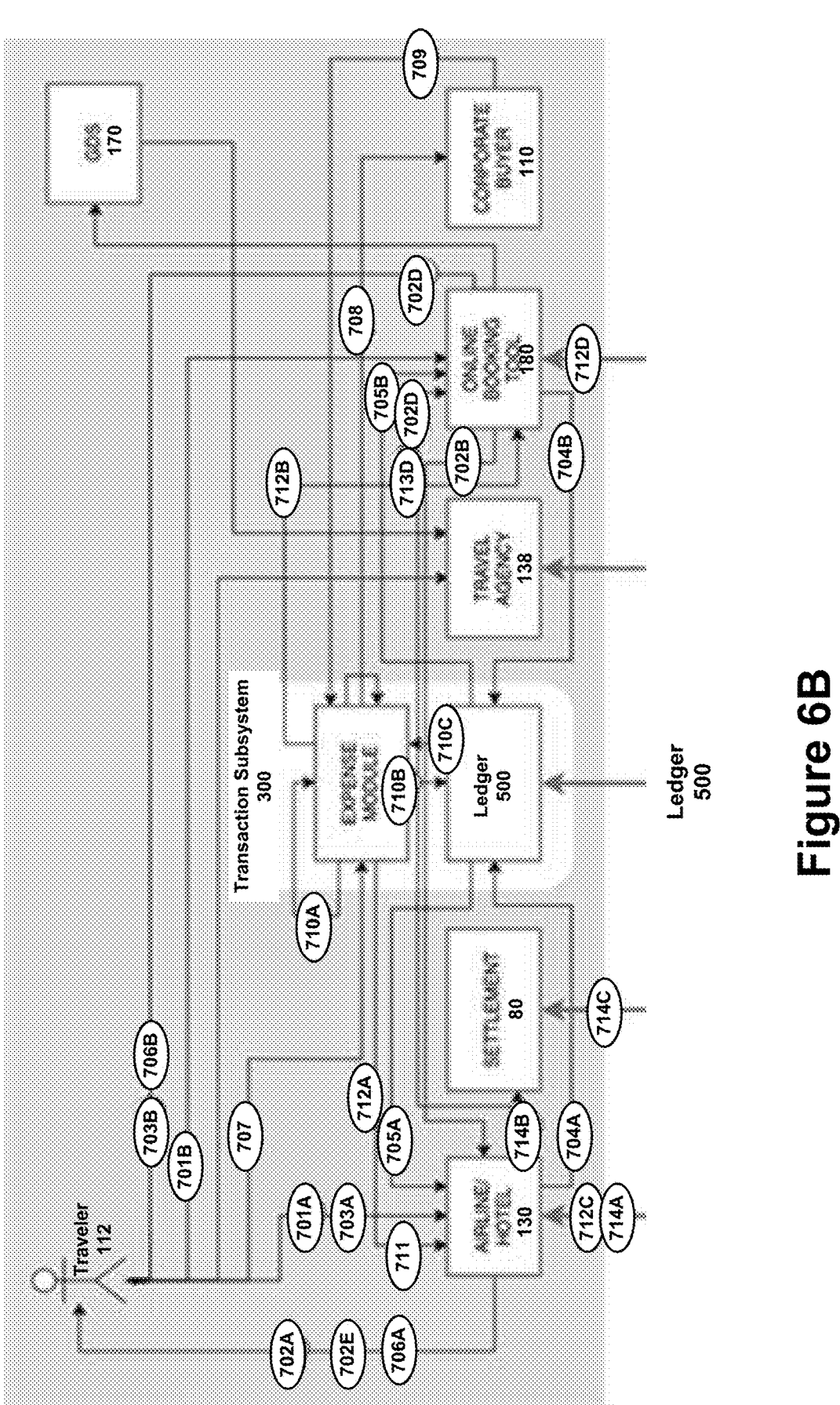
FIG. 6B is a more detailed example of the transaction layer illustrated in FIG. 6A.
Figure 6C:
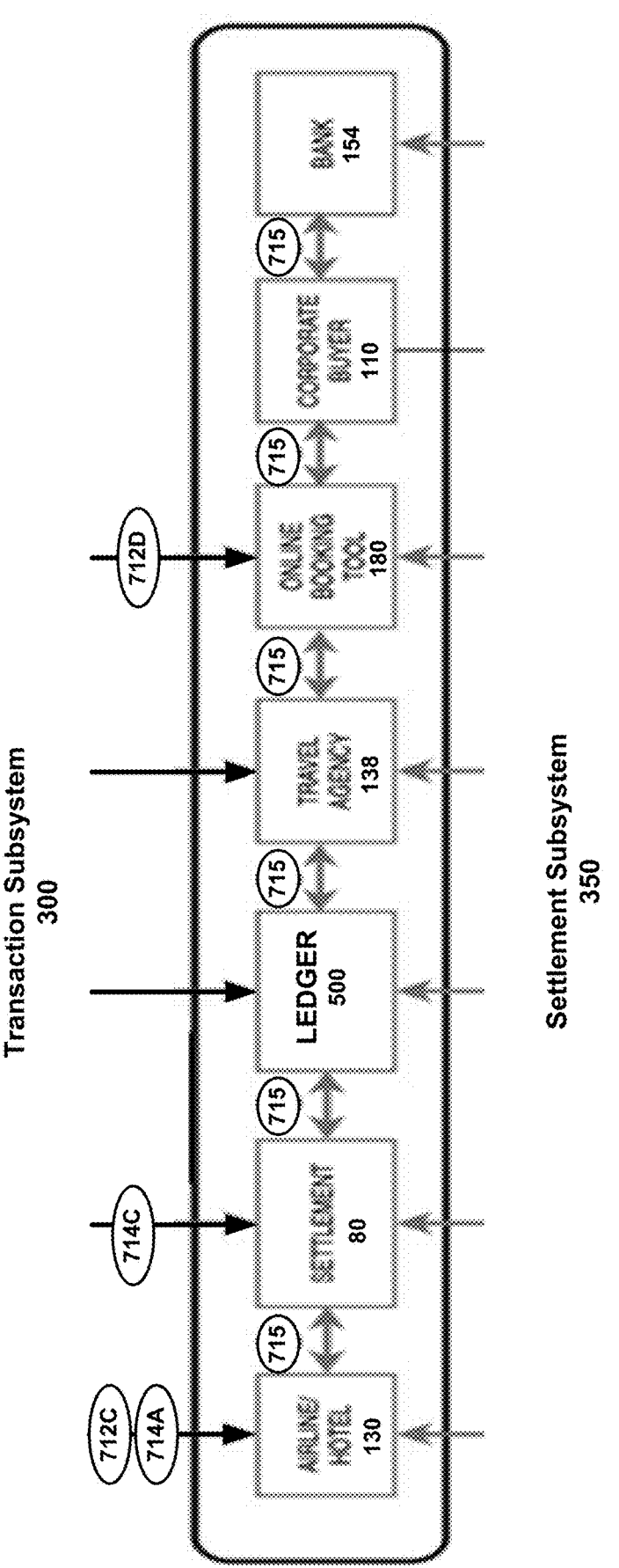
FIG. 6C is a more detailed example of the ledger illustrated in FIG. 6A.
Figure 6D:
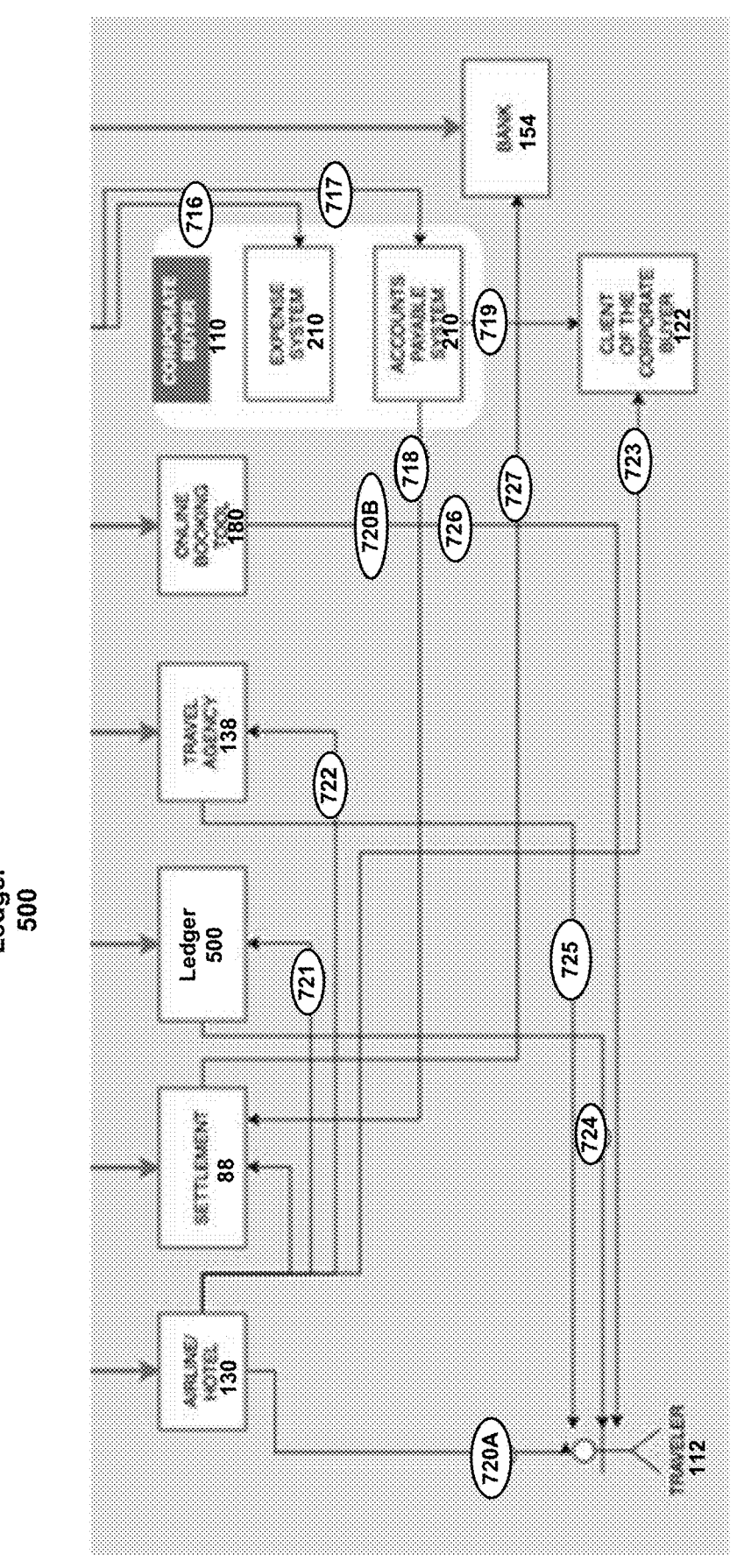
FIG. 6D is a more detailed example of the ledger illustrated in FIG. 6A.

FIG. 6B is a more detailed example of the transaction layer illustrated in FIG. 6A. FIG. 6C is a more detailed example of the ledger illustrated in FIG. 6A. FIG. 6D is a more detailed example of the ledger illustrated in FIG. 6A.

For bookings that are shopped and booked with the supplier, after signing in to the supplier website, (701A) the traveler enters search criteria directly with the supplier, (702A) the supplier returns offers that are in policy with the corporate negotiated rate, (7033A) the traveler selects on offer, (7044A) the supplier passes corporate account code and employee ID to the system 200, (705A) system 200 returns the appropriate expense module criteria, (706A) the supplier presents the appropriate expense module to the traveler, (707) the traveler enters in the appropriate expense information to the module that pertains to his/her trip such as job code and/or cost center code and/or "reason for trip" information, (708) the expense module checks that information with the corporate buyer, (709) the corporate buyer confirms or fails that information, (710A) the expense module creates a unique expense ID or (710B) the module passes the expense data to the blockchain and the blockchain generates the unique expense ID, (711) the expense module authorizes the charge, (712A) the expense module passes the unique ID to the supplier or the (712C) the blockchain passes the unique ID to the supplier via the expense module and the system restricts and prohibits the supplier (through various means, including encryption) from ever being able to access the underlying expense information that the traveler entered on the expense module, (713A) the supplier confirms the reservation, (714A) the supplier writes reservation data and expense ID to the blockchain, (714B) or the supplier passes the reservation and expense ID to the settlement agency, (715) all on-chain parties can access the data on the chain to which they are granted permission via private keys, (716) the expense file generator generates an expense file from the blockchain data and sends that file into the corporate buyer's expense system from the blockchain data, (717) the EDI file generator generates an EDI file from the blockchain data and sends that file into the corporate buyer's accounts payable system from the blockchain data, (718) the corporate expense- and accounts-payable systems ingest the expense and EDI files and issues funds from the blockchain data, (719) the corporate expense- and accounts-payable systems ingest the expense and EDI files and issues invoices to the corporate buyer's client, from the blockchain data, (720A) the supplier sends reservation status information from the blockchain data to the traveler, (721) the supplier sends reservation status information from the blockchain data to system 200, (722) the supplier sends reservation status information from the blockchain data to the agency, (723) the supplier assigns unused ticket funds to the client of the corporate buyer, (724) system 200 sends calendar data to the traveler from system data, (725) the travel agency sends reservation and ticket info to the traveler, (726) the online booking tool sends reservation and ticket info to the traveler, (727) the settlement agency issues funds to corporate buyer and supplier bank accounts.

For bookings that are shopped and booked with an online booking tool (OBT), after signing in to the OBT, (701B) the traveler enters search criteria directly with the supplier, (702B) the OBT queries the supplier for offers, (702C) the supplier returns available offers, (702D) the OBT filters offers for negotiated, in-policy offers and displays them to the traveler, (703B) the traveler selects on offer, (704B) the OBT passes corporate account code and employee ID to System 200, (705B) System 200 returns the appropriate expense module criteria, (706B) the OBT presents the appropriate expense module to the traveler, (707) the traveler enters in the appropriate expense information to the module that pertains to his/her trip such as job code and/or cost center code and/or "reason for trip" information, (708)

the expense module checks that information with the corporate buyer, (709) the corporate buyer confirms or fails that information, (710A) the expense module creates a unique expense ID or (710B) the module passes the expense data to the blockchain and the blockchain generates the unique expense ID, (711) the expense module authorizes the charge, (712A) the expense module passes the unique ID to the supplier or the (712C) the blockchain passes the unique ID to the supplier via the expense module and the system restricts and prohibits the supplier (through various means, including encryption) from ever being able to access the underlying expense information that the traveler entered on the expense module, (713A) the supplier confirms the reservation, (714A) the supplier writes reservation data and expense ID to the blockchain, (714B) or the supplier passes the reservation and expense ID to the settlement agency, (715) all on-chain parties can access the data on the chain to which they are granted permission via private keys, (716) the expense file generator generates an expense file from the blockchain data and sends that file into the corporate buyer's expense system from the blockchain data, (717) the EDI file generator generates an EDI file from the blockchain data and sends that file into the corporate buyer's accounts payable system from the blockchain data, (718) the corporate expense- and accounts-payable systems ingest the expense and EDI files and issues funds from the blockchain data, (719) the corporate expense- and accounts-payable systems ingest the expense and EDI files and issues invoices to the corporate buyer's client, from the blockchain data, (720A) the supplier sends reservation status information from the blockchain data to the traveler, (721) the supplier sends reservation status information from the blockchain data to System 200, (722) the supplier sends reservation status information from the blockchain data to the agency, (723) the supplier assigns unused ticket funds to the client of the corporate buyer, (724) System 200 sends calendar data to the traveler from blockchain data, (725) the travel agency sends reservation and ticket info to the traveler, (726) the online booking tool sends reservation and ticket info to the traveler, (727) the settlement agency issues funds to corporate buyer and supplier bank accounts. Table 2 below corresponds to FIGS. 6B-6D.

TABLE 2

| # | From | To | Action | Layer |
|---|------|----|--------|-------|
| 701 | Traveler | Vendor | Enter search criteria | Transaction |
| 701A | Traveler | OBT | Enter search criteria | Transaction |
| 701B | Traveler | Vendor | Enter search criteria | Transaction |
| 702A | Vendor | Traveler | Returns corporate negotiated offers filtered for travel policies | Transaction |
| 702B | OBT (online booking tool) | Vendor | Queries vendor for offers | Transaction |
| 702B | Vendor | OBT | Returns available offers | Transaction |
| 702B | OBT | Traveler | Returns corporate negotiated offers filtered for travel policies | Transaction |
| 702C | Vendor | Traveler | Returns corporate negotiated offers filtered for travel policies | Transaction |
| 703A | Traveler | Vendor | Selects offer | Transaction |
| 703B | Traveler | OBT | Selects offer | Transaction |
| 704A | Vendor | Ledger | Passes corporate account code and employment ID | Transaction |
| 704B | OBT | Ledger | Passes corporate account code and employment ID | Transaction |
| 705A | Host | Vendor | Returns appropriate expense module criteria | Transaction |
| 705B | Host | OBT | Returns appropriate expense module criteria | Transaction |
| 706A | Vendor | Traveler | Presents appropriate expense module | Transaction |

TABLE 2-continued

| # | From | To | Action | Layer |
|---|------|-----|--------|-------|
| 706B | OBT | Traveler | Presents appropriate expense module | Transaction |
| 707 | Traveler | Expense Module | Enters expense information | Transaction |
| 708 | Expense Module | Organization | Confirm expense information | Transaction |
| 709 | Organization | Expense Module | Confirm expense information | Transaction |
| 710A | Expense Module | Expense Module | Generate expense ID | Transaction |
| 710B | Expense Module | Ledger | Generate expense ID | Transaction |
| 711 | Expense Module | Vendor | Authorize charge | Transaction |
| 712A | Expense Module | Vendor | Passes expense ID | Transaction |
| 712B | Expense Module | OBT | Passes expense ID | Transaction |
| 712C | Ledger | Vendor | Passes expense ID | Transaction |
| 712D | Ledger | OBT | Passes expense ID | Transaction |
| 713A | Vendor | Traveler | Confirms reservation | Transaction |
| 714B | Vendor | OBT | Confirms reservation | Transaction |
| 714A | Vendor | Settlement | Writes reservation information and expense ID | Transaction |
| 714B | Settlement | Ledger | Passes reservation information and expense ID | Transaction |
| 715 | ALL | ALL | Distribute and partition data | Ledger |
| 716 | Organization | Expense system | Deliver expense file | Settlement |
| 717 | Organization | Accounts payable | Deliver EDI/Accounting file | Settlement |
| 718 | Accounts Payable | Settlement | Issue funds | Settlement |
| 719 | Accounts Payable | Client of Organization | Issue invoice | Settlement |
| 720A | Vendor | Traveler | Issue reservation status and info | Settlement |
| 720B | OBT | Traveler | Issue reservation status and info | Settlement |
| 721 | Vendor | Host | Issue reservation status and settlement info | Settlement |
| 722 | Vendor | Trave; Agency | Issue reservation status and settlement info | Settlement |
| 723 | Vendor | Client of Organization | Assign un-used tickets | Settlement |
| 724 | Host | Traveler | Issue calendar data | Settlement |
| 725 | Travel Agency | Traveler | Issue reservation status and info | Settlement |
| 726 | OBT | Traveler | Issue reservation status and info | Settlement |
| 727 | Settlement | Bank | Issues funds | Settlement |

The invention claimed is:

1. A computer-enabled transaction clearinghouse system (200) for a transaction (60) involving a plurality of parties (100), the plurality of parties (100) including an individual (112), an organization (110) with whom the individual (112) has an association (106), and a vendor (130) entering into the transaction (60) with the individual (112), said system (200) comprising:

a plurality of processors (222) connected to a network (260), wherein the individual (112) interacts with the system (200) through said first processor (220), wherein the organization (110) interacts with the system (200) through a second processor (220) and vendor (130) interacts with the system (200) through a third processor (220);

a ledger (500) that is selectively accessible to the parties (100), wherein said ledger (500) is a blockchain ledger (502) selectively accessible to said plurality of processors (222);

a transaction subsystem (300) adapted to execute the transaction (60) between the individual (112) and the vendor (130), wherein the transaction (60) is recorded on the ledger (500) that is accessible to the individual (112) through said first processor (220), accessible to the organization (110) through said second processor (220), and accessible to the vendor (130) through said third processor (220); and a settlement subsystem (350) adapted to effectuate a settlement (80) from the organization (110) to the vendor (130), wherein the settlement (80) is enabled by an expense authorization (96) that is stored on the ledger (500) that is accessible to the individual (112) through said first processor (220), accessible to the organization (110) through said second processor (220), and accessible to the vendor (130) through said third processor (220);

wherein said transaction subsystem (300) enables the organization (110) to authorize said transaction (60) between the individual (112) and the vendor (130) before said transaction (60) is executed between the individual (112) and the vendor (130);

wherein said settlement subsystem (350) enables the organization (110) to directly effectuate a settlement (80) to the vender (130) rather than indirectly through a reimbursement to the individual (112);

wherein said blockchain ledger (502) includes a ledger record (520) that includes both a transaction record (530) of said transaction (60) and a settlement record (540) of said settlement (80);

wherein said ledger record (520) is accessible to the individual (112) through said first processor (220);

wherein said ledger record (520) is accessible to the organization (110) through said second processor (220); and wherein said ledger record (520) is accessible to the vendor (130).

2. The computer-enabled transaction clearinghouse system (200) of claim 1, wherein the transaction subsystem (300) uses the expense authorization (96) originated from the organization (110) through said second processor (220) as a monetary consideration (70) for the transaction (60), wherein the individual (112), the organization (220), and the vendor (130) each have access to both said transaction record (530) of the transaction (60) and said settlement record (540) of said settlement (80).

3. The computer-enabled transaction clearinghouse system (200) of claim 1, wherein the transaction (60) does not involve the individual (112) using a credit authorization (77) or a debit card authorization (78) from said first processor (220).

4. The computer-enabled transaction clearinghouse system (200) of claim 1, wherein a non-monetary consideration (62) agreed to be provided by the vendor (130) through said third processor (220) to the individual (112) through said second processor (220) is a business travel service (63) for the benefit of the organization (110).

5. The computer-enabled transaction clearinghouse system (200) of claim 1, said plurality of processors (220) including a fourth processor (220) through which a financial services organization (150) interacts with the system (200), wherein the settlement (80) originates from an account (158) that the organization (110) has at financial services organization (150) that is controlled from said fourth processor (220), and wherein said ledger record (520) is accessible the financial services organization (150) through said fourth processor (220).

6. The computer-enabled transaction clearinghouse system (200) of claim 1, said plurality of processors (220) including a fourth processor through which a financial services organization (150) interacts with the system (200), wherein the settlement (80) is sent to an account (158) that the vendor (130) has at a financial services organization (150) that is controlled from said forth processor (220), and wherein said ledger record (520) is accessible the financial services organization (150) through said fourth processor (220).

7. The computer-enabled transaction clearinghouse system (200) of claim 1, wherein said first processor (220) provides for receiving a plurality of search criteria from the individual (112), wherein said search results generated by said search criteria are selectively influenced by a project (109) established by the organization (110) through said second processor (220).

8. The computer-enabled transaction clearinghouse system (200) of claim 1, wherein the settlement (80) is a real-time settlement (81) that is recorded on said blockchain ledger (502) where it is accessible to the individual (112), the organization (110), a financial services organization (150) and the vendor (130).

9. The computer-enabled transaction clearinghouse system (200) of claim 1, wherein the individual (112) is an employee of the organization (110) issuing the expense authorization (96) that is validated from said second processor (220) before it is issued from said first processor (220) and wherein the expense authorization (96) is validated before the individual (112) is able to execute said transaction (60).

10. The computer-enabled transaction clearinghouse system (200) of claim 1, wherein no expense report (360) is submitted by individual (112) from said first processor (220) to organization (110) at said second processor (220) because the payment to the vendor (130) is made directly by the organization (110).

11. The computer-enabled transaction clearinghouse system (200) of claim 1, said plurality of processors (220) including a fourth processor (220) operated by a customer (122) of the organization (110), wherein the plurality of parties (100) includes a customer (122) of the organization (110), wherein the organization (110) is an employer of the individual (112), and wherein the expense authorization (96) for the settlement (80) for the vendor (130) originates from the customer (122) though said fourth processor (220), and wherein said ledger record (520) is accessible the customer (122) through said fourth processor (220).

12. The computer-enabled transaction clearinghouse system (200) of claim 1, wherein each said expense authorization (96) is associated with an expense code (97) that is defined by the organization (110) through the operation of said second processor (220), and wherein said expense code (97) is recorded on said ledger record (520).

13. The computer-enabled transaction clearinghouse system (200) of claim 12, wherein said expense authorization (96) and said expense code (97) are recorded on said ledger record (520) with the transaction (60) at the same time as when the transaction (60) is entered into between the individual (112) from said first processor (220) and the vendor (130) from said third processor (220).

14. The computer-enabled transaction clearinghouse system (200) of claim 13, wherein the use of the non-monetary consideration (62) is recorded on said ledger record (520), and wherein the entry of said non-monetary consideration (62) on said ledger record (520).

15. The computer-enabled transaction clearinghouse system (200) of claim 13, wherein a credit (88) is associated with an unused consideration (66) retained by the organization (110), and wherein said credit (88) is recorded on said ledger record (520).

16. The computer-enabled transaction clearinghouse system (200) of claim 15 wherein said transaction clearinghouse system (200) generates a prohibition (280) against the unauthorized use of the credit (88) by the individual (112) accessing the system (200) through said first processor (220), wherein said prohibition (280) is generated by said second processor (220).

17. A computer-enabled transaction clearinghouse system (200) for a transaction (60) involving a plurality of parties (100), the plurality of parties (100) including an individual (112), the organization (110) with whom the individual (112) has an association, and a vendor (130) entering into the transaction (60) with the individual (112), said system (200) comprising:

a plurality of processors (222) connected to a network (260), wherein the individual (112) interacts with the system (200) through said first processor (220), wherein the organization (110) interacts with the system (200) through a second processor (220) and vendor (130) interacts with the system (200) through a third processor (220);

a ledger (500) that is selectively accessible to the parties (100), wherein said ledger (500) is a blockchain ledger (502) selectively accessible to said plurality of processors (222);

a transaction subsystem (300) adapted to execute the transaction (60) between the individual (112) and the vendor (130), wherein the transaction (60) is recorded on the ledger (500) that is accessible to the individual (112) through said first processor (220), accessible to the organization (110) through said second processor (220), and accessible to the vendor (130) through said third processor (220); and wherein an expense authorization (96) by the organization is used by the individual (112) as monetary consideration (70) for the transaction (60), wherein the transaction (60) includes non-monetary consideration (62) in the form of a business travel service (63) provided by the vendor (130) to the individual (112); and a settlement subsystem (350) adapted to effectuate a settlement (80) from the organization (110) to the vendor (130), wherein the settlement (80) is enabled by an expense authorization (96) stored on the ledger (500) that is accessible to the individual (112) through said first processor (220), accessible to the organization (110) through said second processor (220), and accessible to the vendor (130) through said third processor (220), and wherein the settlement (80) does not involve a credit authorization (77) or a debit card authorization (78)

wherein said blockchain ledger (502) includes a ledger record (520) that includes both a transaction record (530) of said transaction (60) and a settlement record (540) of said settlement (80);

wherein said ledger record (520) is accessible to the individual (112) through said first processor (220);

wherein said ledger record (520) is accessible to the organization (110) through said second processor (220); and wherein said ledger record (520) is accessible to the vendor (130) through said third processor.

18. The computer-enabled transaction clearinghouse system (200) of claim 17, said plurality of processors (220) including a fourth processor (220) controlled by a first financial services company (150) and a fifth processor (220) controlled by a second financial services company (150), wherein the settlement (80) originates from a first account (158) that the organization (110) has at a first financial services company (150) controlled by said fourth processor (220) and wherein the settlement (80) arrives at a second account (158) that the organization (110) has at a second financial services organization (150) controlled by said fifth processor (220), wherein the settlement (80) is a real-time settlement (81), wherein the expense authorization (96) is associated with the individual (112) prior to the formation of the transaction (60), wherein no separate expense report (360) is submitted by individual (112) to organization (110), wherein each said expense authorization (96) is associated with an expense code (97) that is recorded on said ledger (500) and accessible to the organization (110) through said second processor (220);

wherein said ledger record (520) is accessible to the first financial services company (150) through said fourth processor (220); and wherein said ledger record (520) is accessible to the second financial services company (150) through said fifth processor (220).

19. A computer-enabled transaction clearinghouse method (900) for a transaction (70) involving a plurality of parties (100) interacting with each other and a ledger (500) from a plurality of processors (220), the plurality of parties (100) including an individual (112) utilizing a first processor (220), the organization (110) with whom the individual (112) has an association utilizing a second processor (220), and a vendor (130) entering into the transaction (60) with the individual (112) utilizing a third processor (220), said method (900) comprising:

recording a transaction (60) between an individual (112) from said first processor (220) and a vendor (130) from said third processor (220) onto a blockchain ledger (502) that is selectively assessable to the individual (112) from said first processor (220), the organization (110) from said second processor (220), and the vendor (130) from said third processor (220), wherein the transaction (60) includes a monetary consideration (70) in the form of an expense authorization (96) from the organization (110) associated with the individual (112) and a non-monetary consideration (62) provided by the vendor (130) to the individual (112), wherein the expense authorization (96) is generated from said second processor (220), and wherein non-monetary consideration (62) provided by the vendor (130) is specified through said third processor (220); and settling the transaction (60) by a settlement subsystem (350) adapted to effectuate a settlement (80) from the organization (110) utilizing said second processor (220) to the vendor (130) utilizing said third processor (220), wherein the settlement (80) is enabled by an expense authorization (96) stored on the blockchain ledger (502), and wherein the settling of the transaction (60) is further recorded onto the blockchain ledger (502);

wherein said transaction subsystem (300) enables the organization (110) to selectively authorize said transaction (60) between the individual (112) and the vendor (130) before said transaction (60) is executed; and where said settlement subsystem (350) enable the organization (110) to directly effectuate a settlement (80) to the vendor (130).

20. The computer-enabled transaction clearinghouse method (900) of claim 19, wherein the non-monetary consideration (62) in the form of a business travel service (63) provided by the vendor (130) to the individual (112), wherein the settlement (80) does not involve a credit authorization (77) or a debit card authorization (78), wherein the settlement (80) originates from a first account (158) that the organization (110) has at a first financial services organization (150) and wherein the settlement (80) arrives at a second account (158) that the organization (110) has at a financial services organization (150), wherein the settlement (80) is a real-time settlement (81), wherein the expense authorization (96) is associated with the individual (112) prior to the formation of the transaction (60), wherein no expense report (360) is submitted by the individual (112) from said first processor (220) to said second processor (220) operated by the organization (110), wherein each said expense authorization (96) is associated with an expense code (97);

wherein said blockchain ledger (502) includes a ledger record (520) that includes both a transaction record (530) of said transaction (60) and a settlement record (540) of said settlement (80);

wherein said ledger record (520) is accessible to the individual (112) through said first processor (220);

wherein said ledger record (520) is accessible to the organization (110) through said second processor (220); and wherein said ledger record (520) is accessible to the vendor (130).

\* \* \* \* \*